(12) United States Patent
Ikehashi et al.

(10) Patent No.: US 7,751,173 B2
(45) Date of Patent: Jul. 6, 2010

(54) SEMICONDUCTOR INTEGRATED CIRCUIT INCLUDING CIRCUIT FOR DRIVING ELECTROSTATIC ACTUATOR, MICRO-ELECTRO-MECHANICAL SYSTEMS, AND DRIVING METHOD OF ELECTROSTATIC ACTUATOR

(75) Inventors: Tamio Ikehashi, Yokohama (JP); Hiroaki Yamazaki, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 819 days.

(21) Appl. No.: 11/672,773

(22) Filed: Feb. 8, 2007

(65) Prior Publication Data
US 2007/0181411 A1 Aug. 9, 2007

(30) Foreign Application Priority Data
Feb. 9, 2006 (JP) .............................. 2006-032587

(51) Int. Cl.
*H01G 5/00* (2006.01)
(52) U.S. Cl. ...................................... 361/271; 361/277
(58) Field of Classification Search .................. 361/207, 361/271, 277; 310/309
See application file for complete search history.

(56) References Cited

U.S. PATENT DOCUMENTS

| 5,367,429 | A | * | 11/1994 | Tsuchitani et al. ........... 361/280 |
| 5,578,976 | A | | 11/1996 | Yao |
| 6,853,476 | B2 | * | 2/2005 | Martin et al. ................ 359/290 |
| 2003/0102771 | A1 | | 6/2003 | Akiba et al. |
| 2006/0065942 | A1 | | 3/2006 | Chou et al. |

* cited by examiner

*Primary Examiner*—Danny Nguyen
(74) *Attorney, Agent, or Firm*—Oblon, Spivak, McClelland, Maier & Neustadt, L.L.P.

(57) ABSTRACT

A semiconductor integrated circuit comprises an electrostatic actuator, an estimation circuit, a storage circuit and a bias circuit. The electrostatic actuator has a top electrode, a bottom electrode, and an insulating film disposed between the top electrode and the bottom electrode. The estimation circuit estimates the amount of a charge accumulated in the insulating film of the electrostatic actuator. The storage circuit stores a result of the estimation of the charge amount by the estimation circuit. The bias circuit changes, on the basis of the estimation result stored in the storage circuit, a drive voltage to drive the electrostatic actuator.

20 Claims, 40 Drawing Sheets

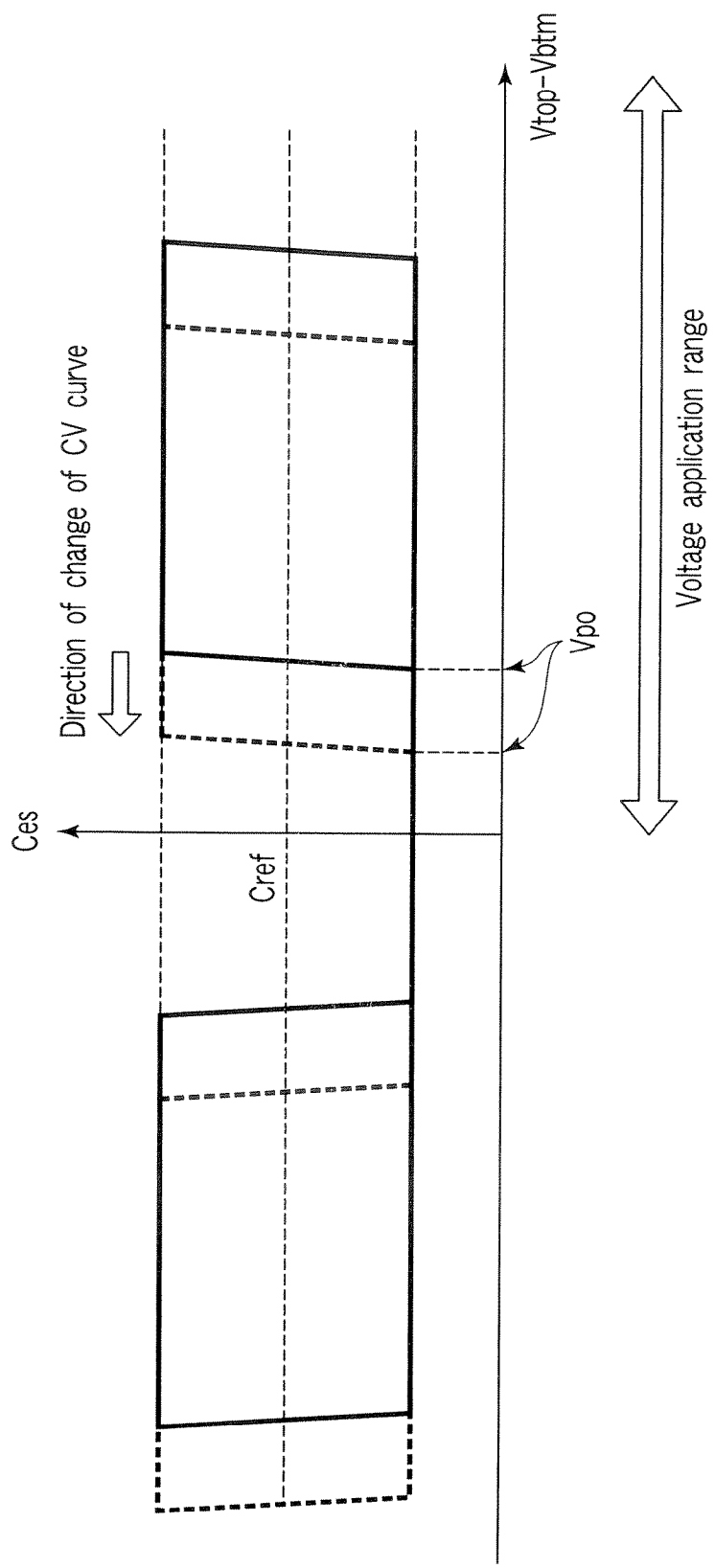
F I G. 1A

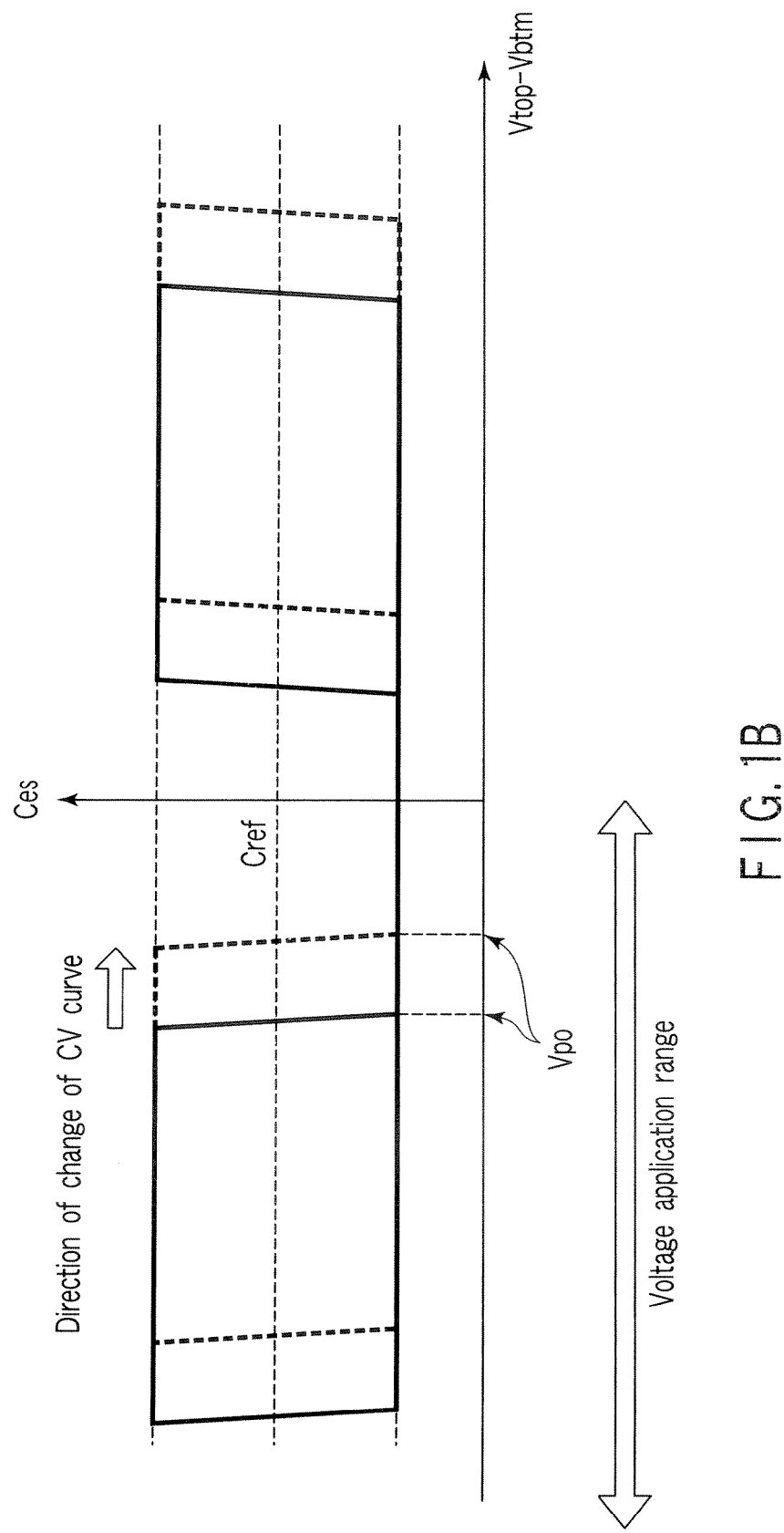
F I G. 1B

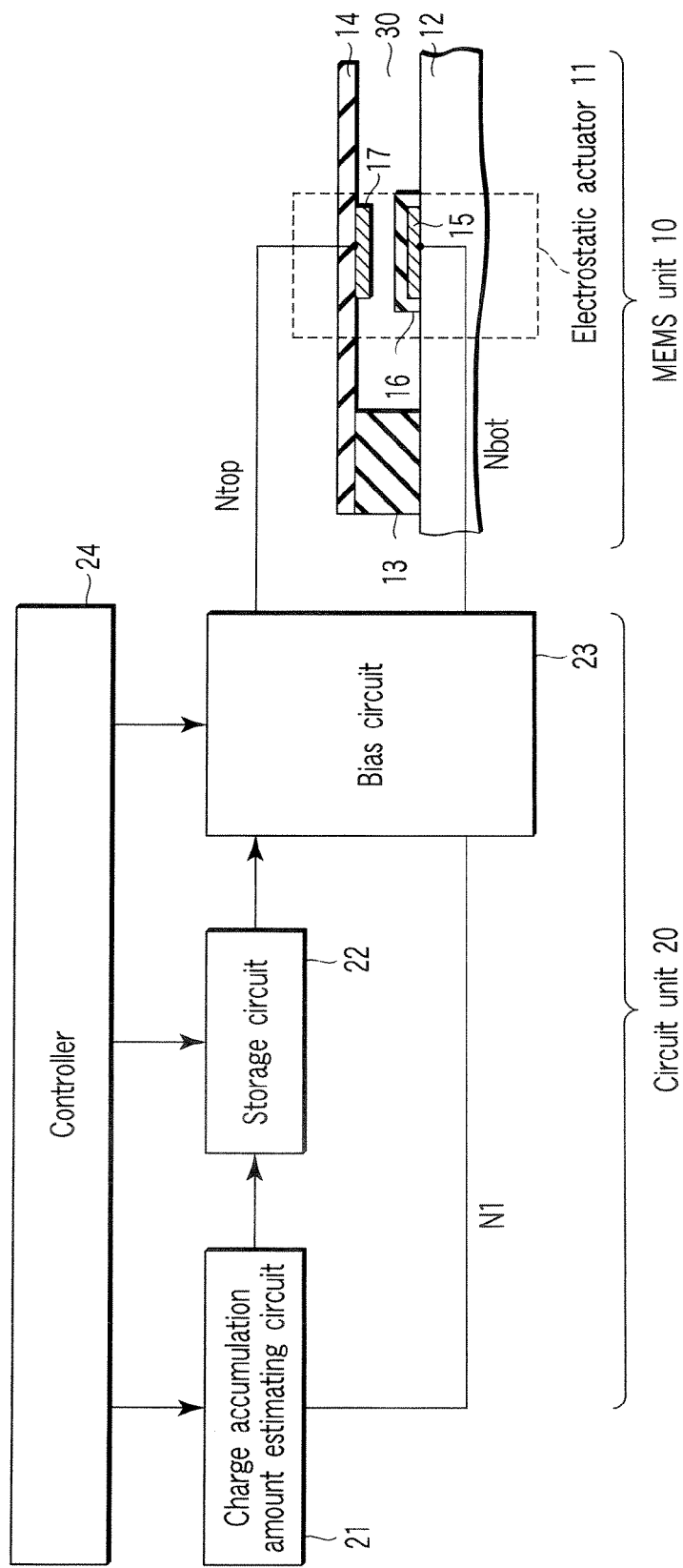
F I G. 1E

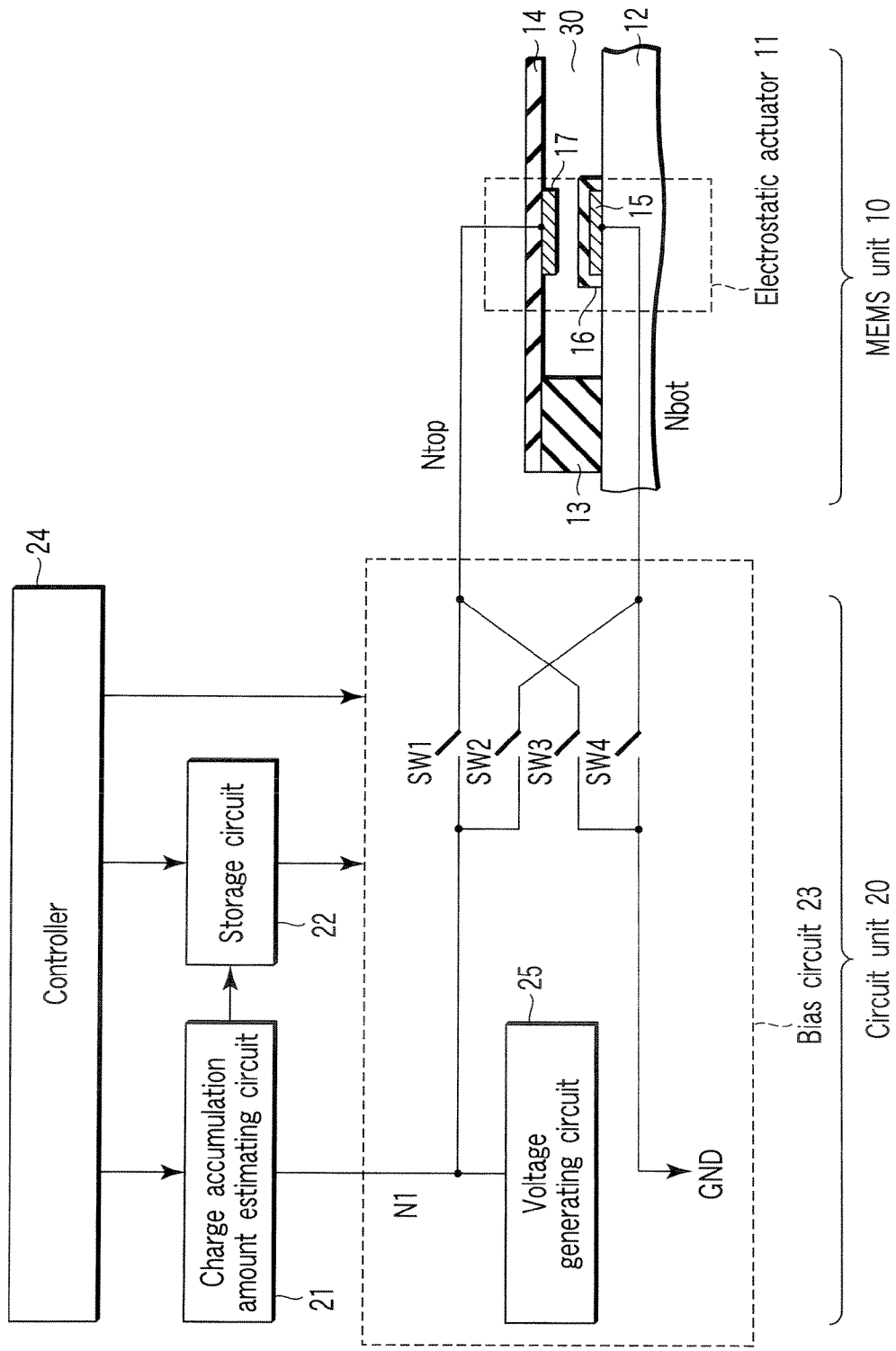
F I G. 5

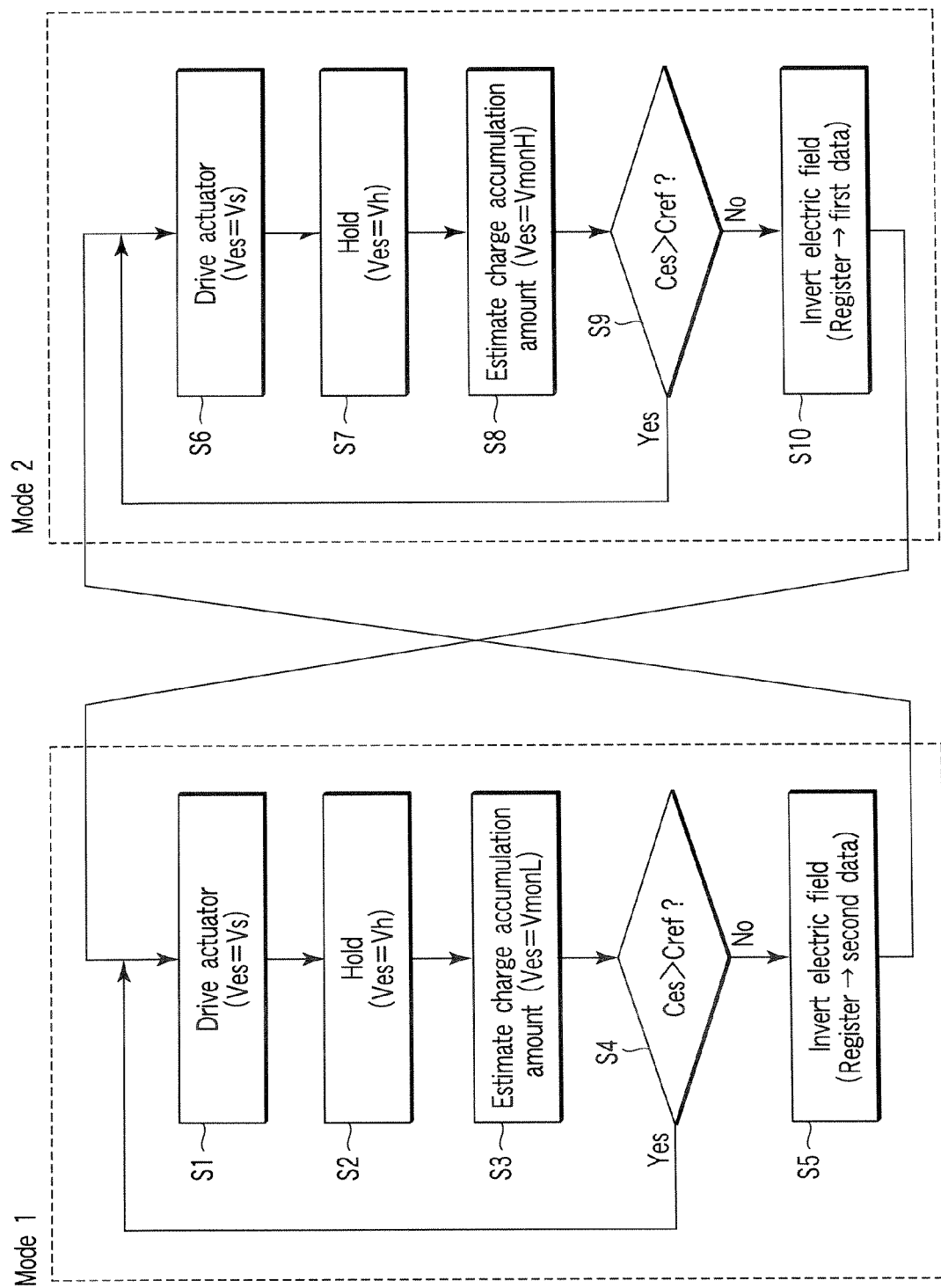
F I G. 11D

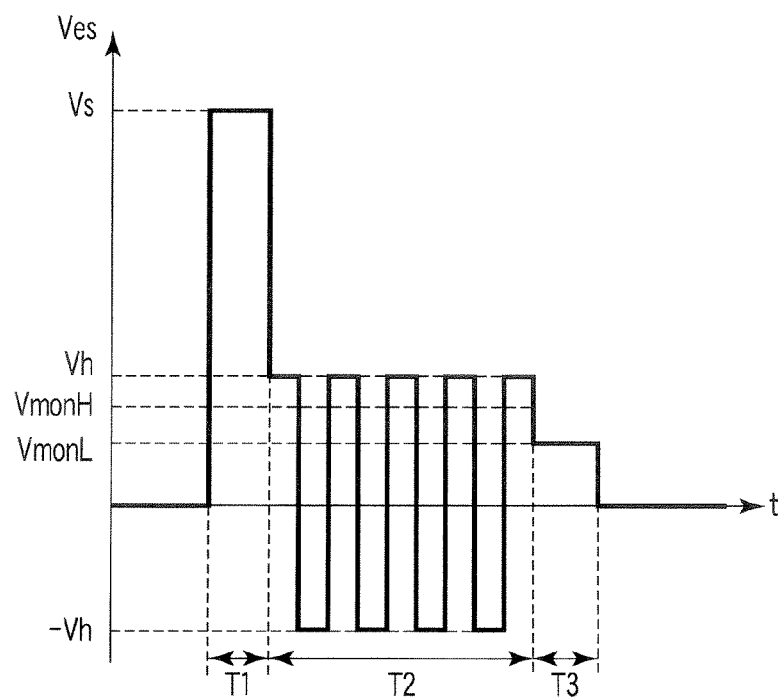
F I G. 16A
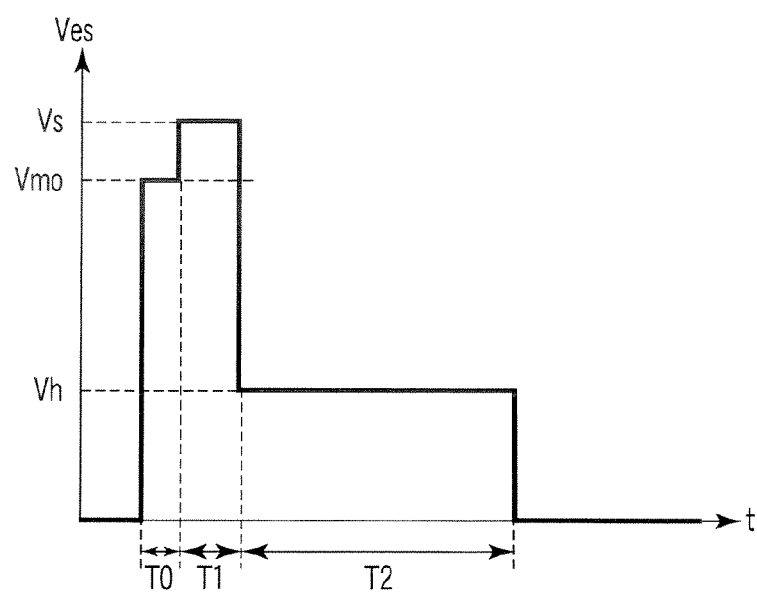
F I G. 16B

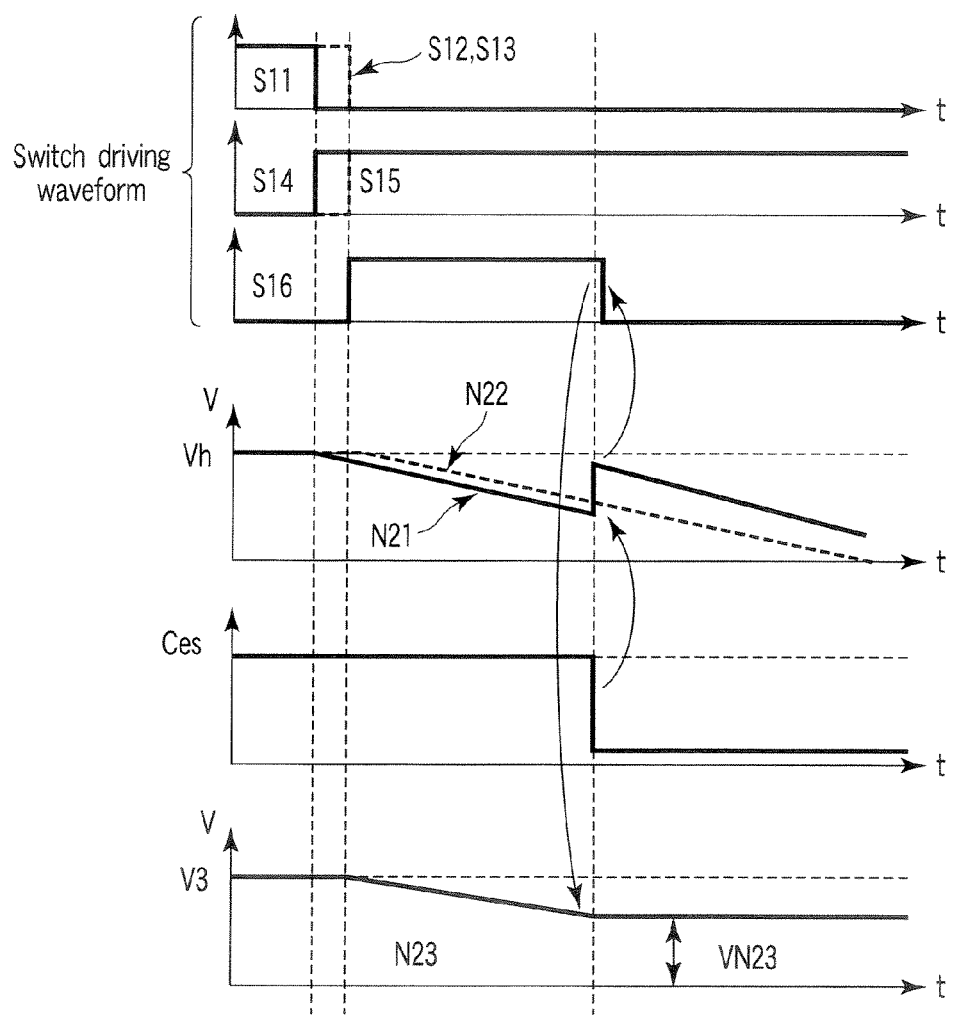
F I G. 18

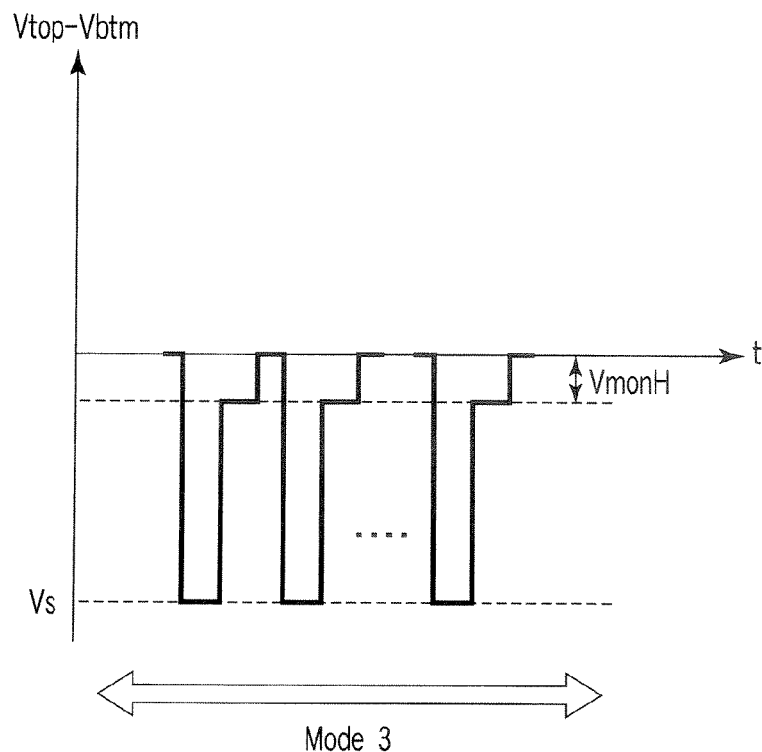
F I G. 26A
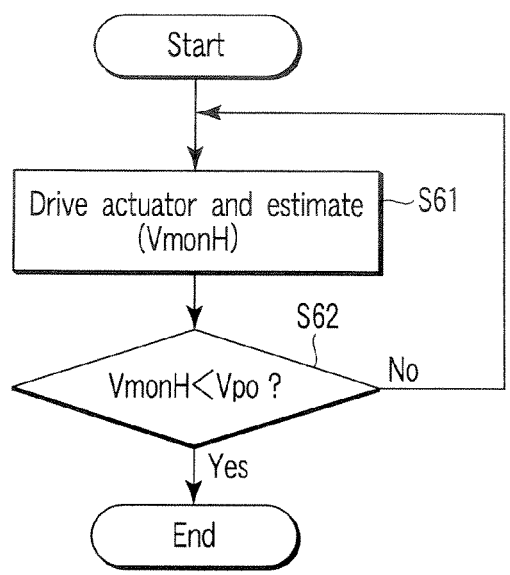
F I G. 26B

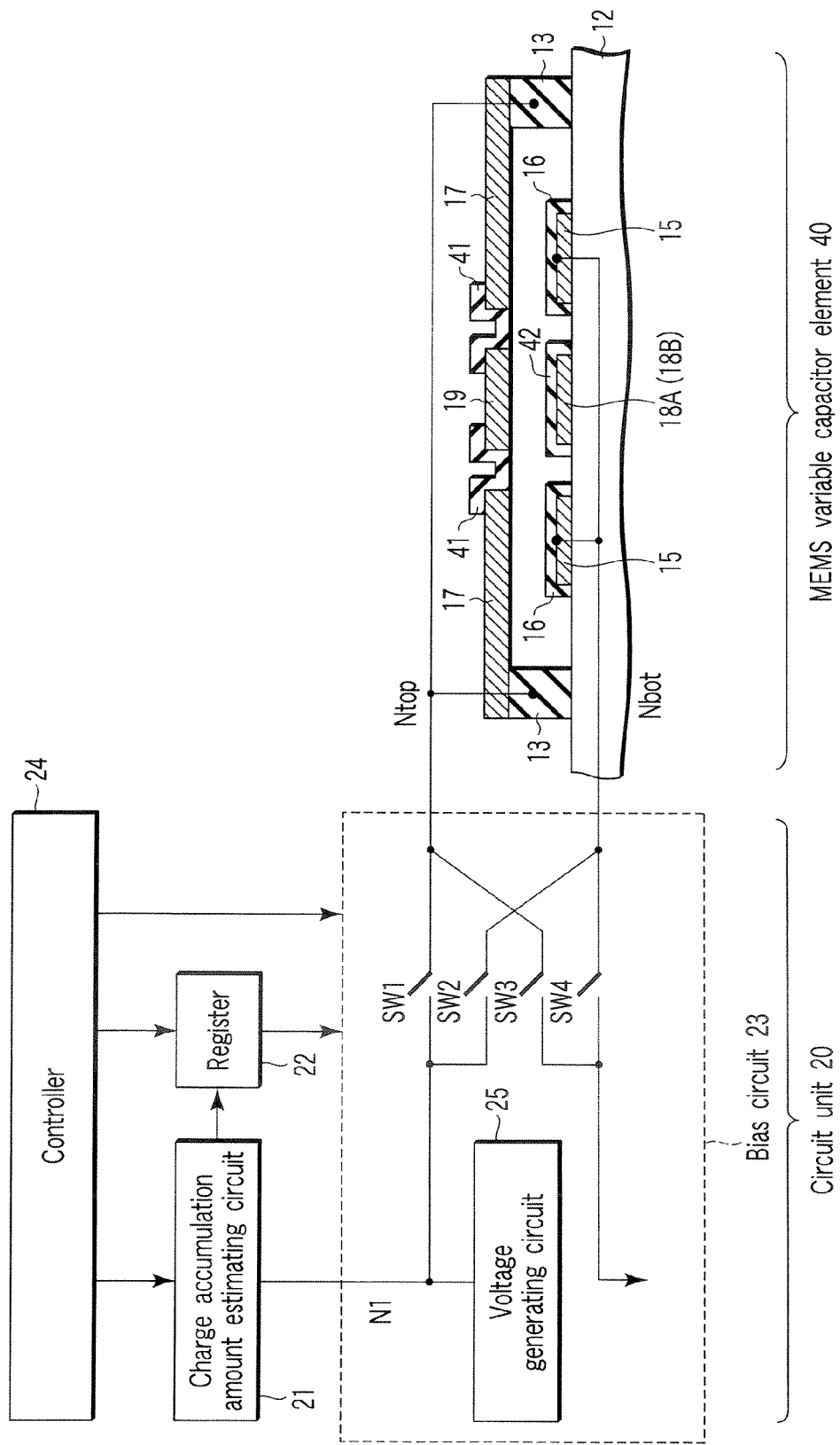
F I G. 30A

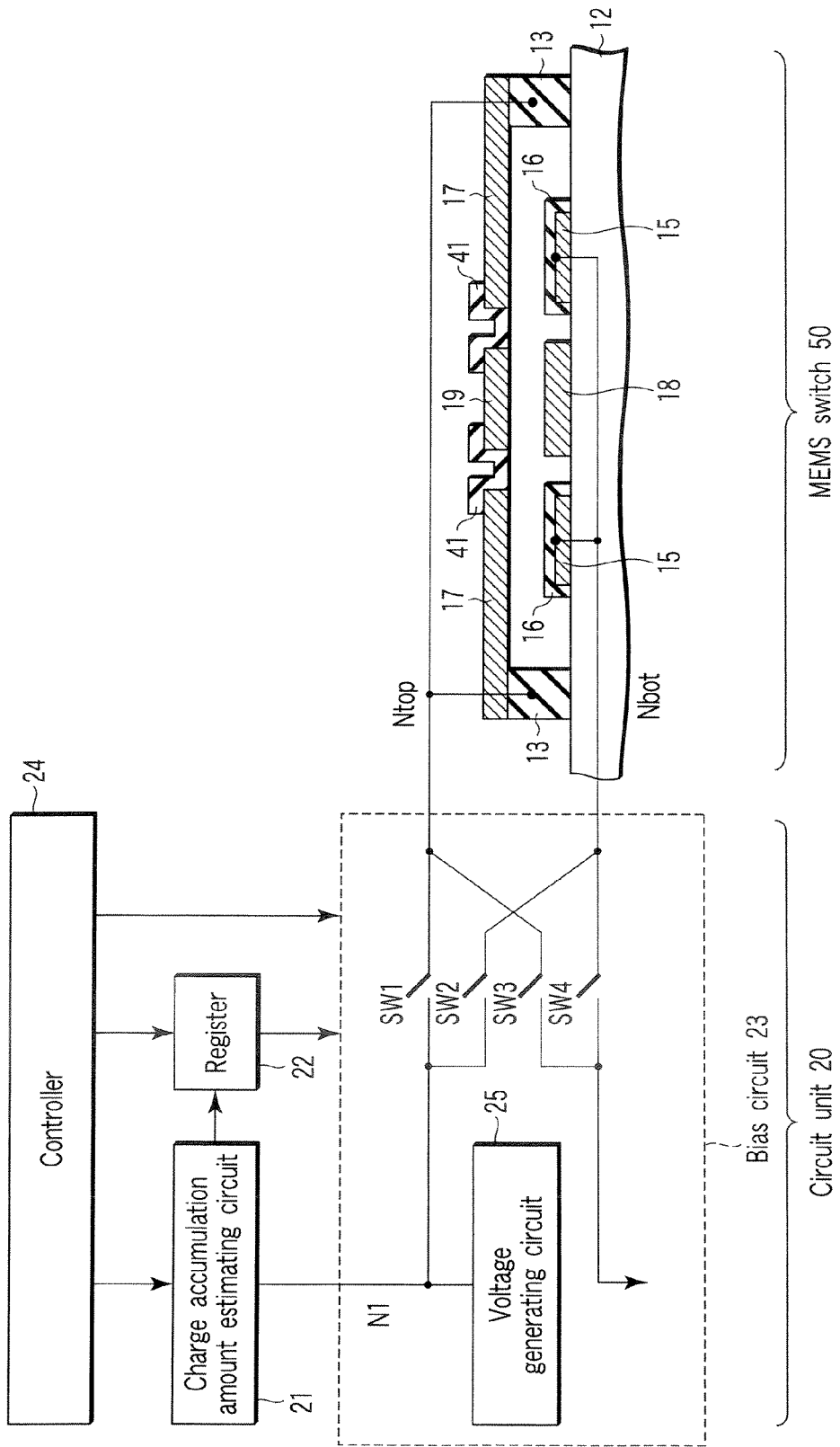
F I G. 31A

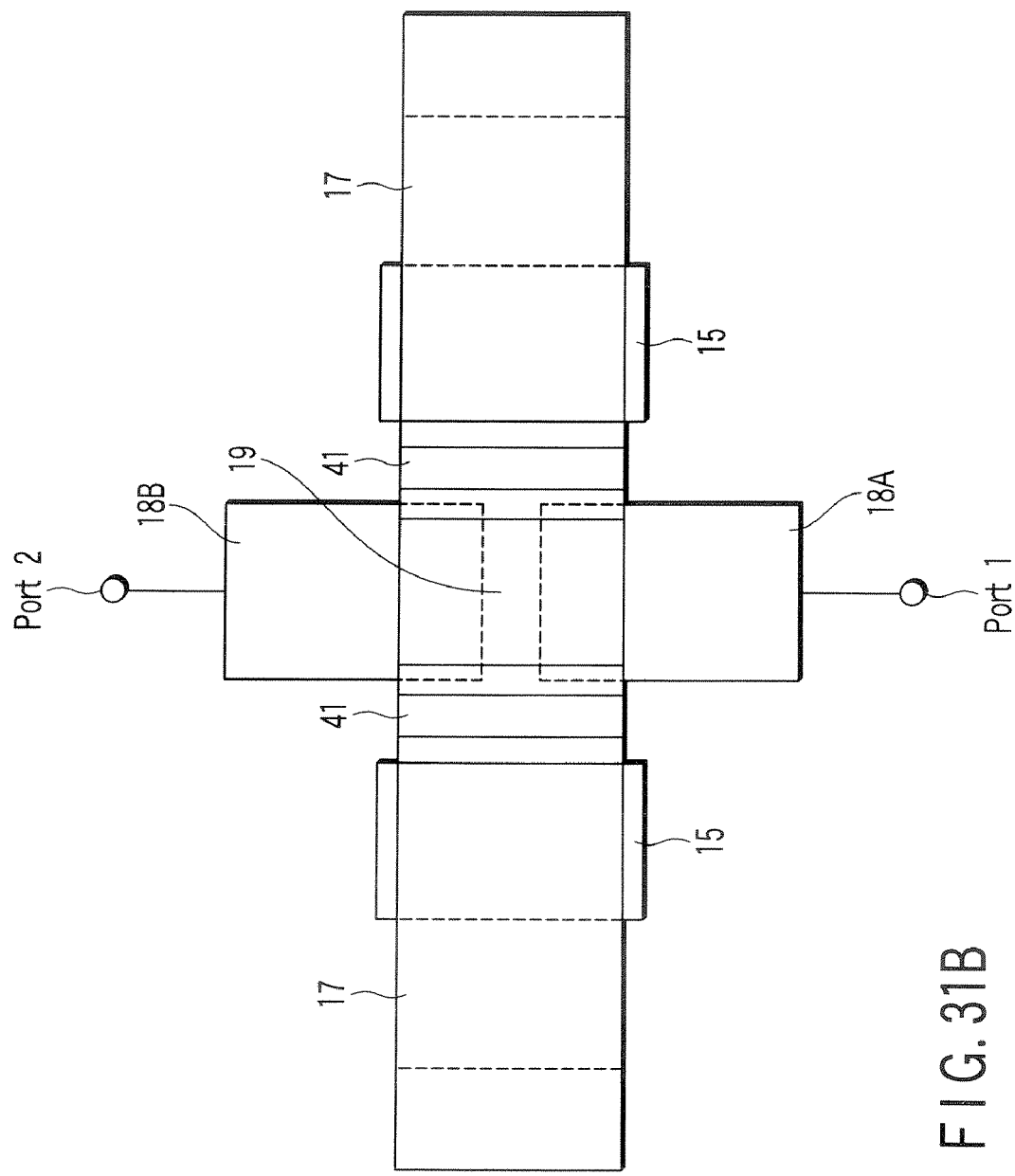
F I G. 31B

SEMICONDUCTOR INTEGRATED CIRCUIT INCLUDING CIRCUIT FOR DRIVING ELECTROSTATIC ACTUATOR, MICRO-ELECTRO-MECHANICAL SYSTEMS, AND DRIVING METHOD OF ELECTROSTATIC ACTUATOR

CROSS-REFERENCE TO RELATED APPLICATIONS

This application is based upon and claims the benefit of priority from prior Japanese Patent Application No. 2006-032587, filed Feb. 9, 2006, the entire contents of which are incorporated herein by reference.

BACKGROUND OF THE INVENTION

1. Field of the Invention

The present invention relates to an art of a micromachine or micro-electro-mechanical systems (MEMS) using an actuator. For example, it relates to a semiconductor integrated circuit including a switch, a variable capacitor element or the like which uses an electrostatic actuator, and a driving method of the electrostatic actuator.

2. Description of the Related Art

The structure of a MEMS switch using an electrostatic actuator has been disclosed in, for example, the specification of U.S. Pat. No. 5,578,976. In order to close the MEMS switch, a potential difference is applied across a top electrode and a bottom electrode of the electrostatic actuator so that electrostatic attraction between these electrodes surpasses the spring force of a beam to which the top electrode is fixedly attached. Normally, it is necessary to apply a potential difference of 20 V or more across the top electrode and the bottom electrode to close the MEMS switch. Hereinafter, the absolute value of this potential difference is called a voltage Vs.

In the closed MEMS switch, the top electrode and the bottom electrode of the electrostatic actuator are in contact with each other via an insulating film. In this case, since there is a potential difference of 20 V or more between the top electrode and the bottom electrode, a charge is injected into the insulating film by an FN tunnel or a Pool-Frenkel mechanism, and trapped by the insulating film. This phenomenon is called the dielectric charging of the electrostatic actuator.

When the amount of the charge accumulated in the insulating film by the dielectric charging is sufficiently large, the top electrode is attracted to the charge in the insulating film even if the potential difference between the top electrode and the bottom electrode is brought to 0 V, so that the switch can not be changed from the closed state to an open state. This phenomenon is called the stiction due to the dielectric charging.

A method of biasing the voltage between the top electrode and the bottom electrode to suppress the stiction is described in G. M. Rebeiz, "RF MEMS Theory, Design, and Technology", Wiley-Interscience, 2003, pp. 190-191. This biasing method has the following three points.

(1) A hold voltage Vh is set lower than the voltage Vs.

(2) The polarity of the drive voltage applied to the top electrode and the bottom electrode is inverted every time (bipolar actuation).

(3) Positive and negative pulses having an amplitude Vh are continuously applied in the held state of the switch.

Here, the hold voltage Vh is a potential difference between the top electrode and the bottom electrode necessary to maintain a closed state (held state) of the switch after this switch is changed from an open state to the closed state. Since the electrostatic attraction between the top electrode and the bottom electrode is proportional to the square of the reciprocal of a distance between these electrodes, the hold voltage Vh can be lower than the voltage Vs.

The amount of the charge trapped in the insulating film can be reduced but can not be totally brought to zero by the biasing method including the above-mentioned three points. The reason is that there is a difference in the amount of the injected charge between the time in which the positive pulse is applied and the time in which the negative pulse is applied. This is attributed to the asymmetry of the charge injection mechanism. Therefore, if the switching between the pulse of the positive voltage and the pulse of the negative voltage is repeated for a sufficiently long time in the held state, the amount of the charge in the insulating film gradually increases, and the stiction finally occurs.

BRIEF SUMMARY OF THE INVENTION

According to a first aspect of the present invention, there is provided a semiconductor integrated circuit comprising: an electrostatic actuator having a top electrode, a bottom electrode, and an insulating film disposed between the top electrode and the bottom electrode; an estimation circuit which estimates the amount of a charge accumulated in the insulating film of the electrostatic actuator; a storage circuit which stores a result of the estimation of the charge amount by the estimation circuit; and a bias circuit which changes, on the basis of the estimation result stored in the storage circuit, a drive voltage to drive the electrostatic actuator.

According to a second aspect of the present invention, there is provided a semiconductor integrated circuit comprising: an electrostatic actuator having a top electrode, a bottom electrode, and an insulating film disposed between the top electrode and the bottom electrode; an estimation circuit which monitors a pull-out voltage to separate the top electrode and the bottom electrode from each other; and a bias circuit which decides, on the basis of the pull-out voltage monitored by the estimation circuit, the direction of an electric field applied to the insulating film by the top electrode and the bottom electrode when the electrostatic actuator is driven.

According to a third aspect of the present invention, there is provided a semiconductor integrated circuit comprising: an electrostatic actuator having a top electrode, a bottom electrode, and an insulating film disposed between the top electrode and the bottom electrode; an estimation circuit which estimates whether the amount of a charge accumulated in the insulating film of the electrostatic actuator is within a predetermined range; and a bias circuit which applies a drive voltage across the top electrode and the bottom electrode to inject or pull out a charge into or from the insulating film so that the charge amount falls within the predetermined range, when it is estimated that the amount of the charge accumulated in the insulating film is not within the predetermined range.

According to a fourth aspect of the present invention, there is provided Micro-electro-mechanical systems (MEMS) comprising: an electrostatic actuator having a top electrode, a bottom electrode, and a first insulating film disposed between the top electrode and the bottom electrode, the bottom electrode being formed on a substrate, the top electrode being disposed so that a cavity is present between the top electrode and the substrate; a first electrode formed on the substrate separately from the bottom electrode; a second electrode formed so that an insulating member is interposed between the second electrode and the top electrode, the second electrode being disposed opposite to the first electrode; and a bias circuit which sets the bottom electrode at a ground voltage while a drive voltage is being applied to the top electrode of the electrostatic actuator and which sets the top electrode at the ground voltage while the drive voltage is being applied to the bottom electrode, wherein the drive voltage and the ground voltage are applied to the top electrode and the bottom electrode by the bias circuit, such that the electrostatic actuator varies the distance between the first electrode and the second electrode.

According to a fifth aspect of the present invention, there is provided a driving method of an electrostatic actuator which has a top electrode, a bottom electrode, and an insulating film disposed between the top electrode and the bottom electrode, the method comprising: detecting one of the power-on and the input of a command; estimating whether the amount of a charge accumulated in the insulating film is within a predetermined range, when one of the power-on and the input of the command is detected; and injecting or pulling out a charge into or from the insulating film so that the amount of the charge accumulated in the insulating film falls within the predetermined range, when it is estimated that the charge amount is not within the predetermined range.

Figure 1C:
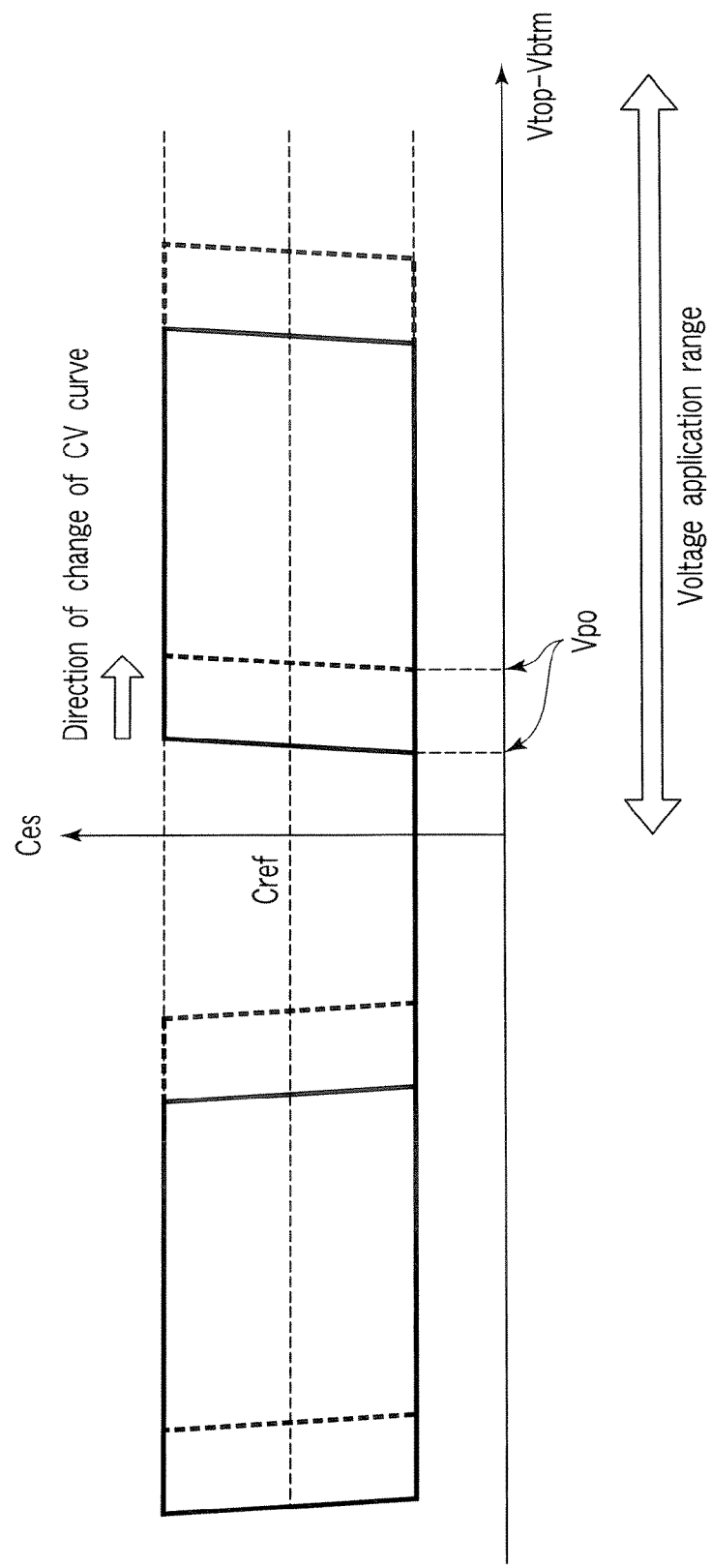
FIG. 1A is a curve showing CV characteristics when a voltage Vs is applied to a top electrode and a bottom electrode is set at a ground voltage in an electrostatic actuator (a case of a first kind of charge injection)
FIG. 1B is a curve showing CV characteristics when the voltage Vs is applied to the bottom electrode and the top electrode is set at the ground voltage in the electrostatic actuator (a case of the first kind of charge injection)
Figure 1D:
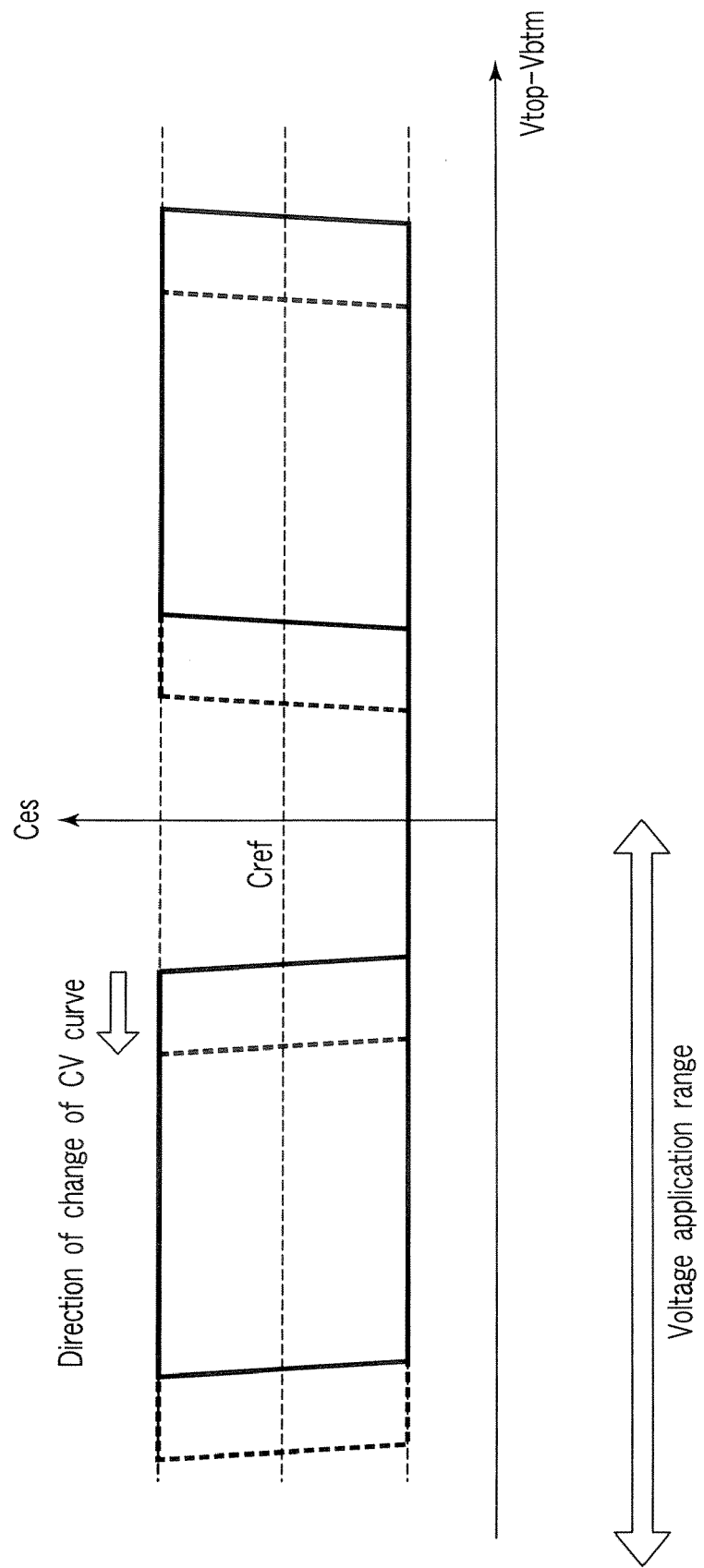
Figure 2:
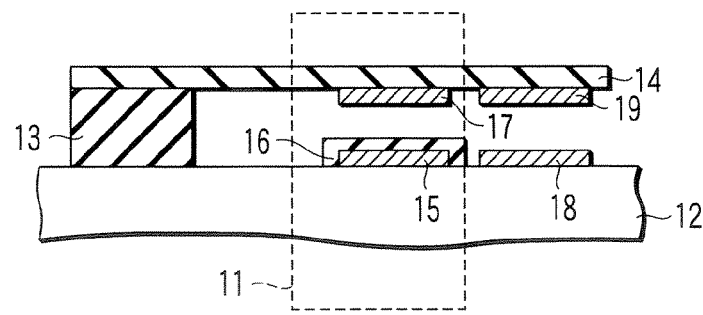
Figure 3:
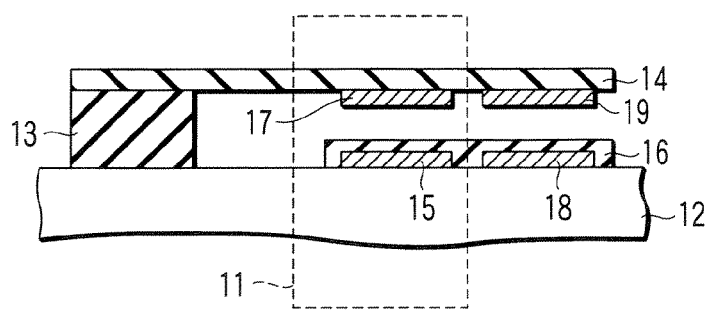
Figure 4:
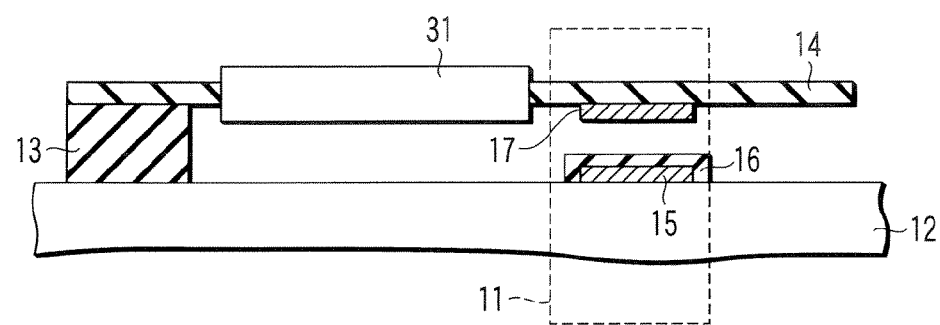
Figure 6A:
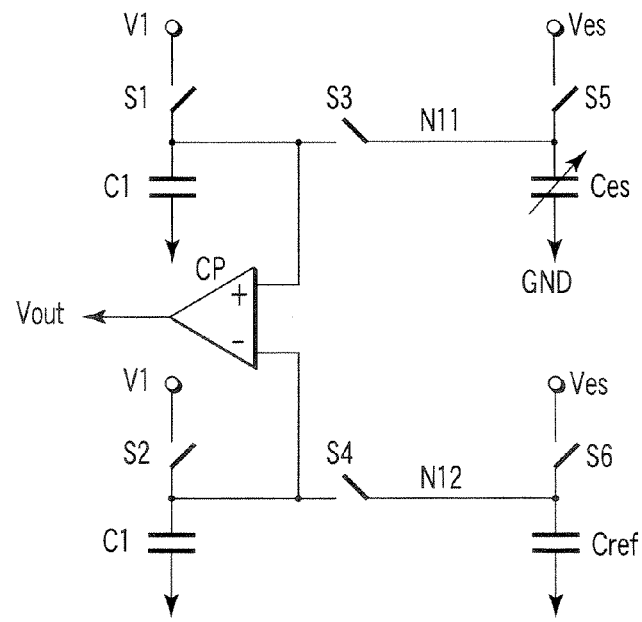
Figure 6B:
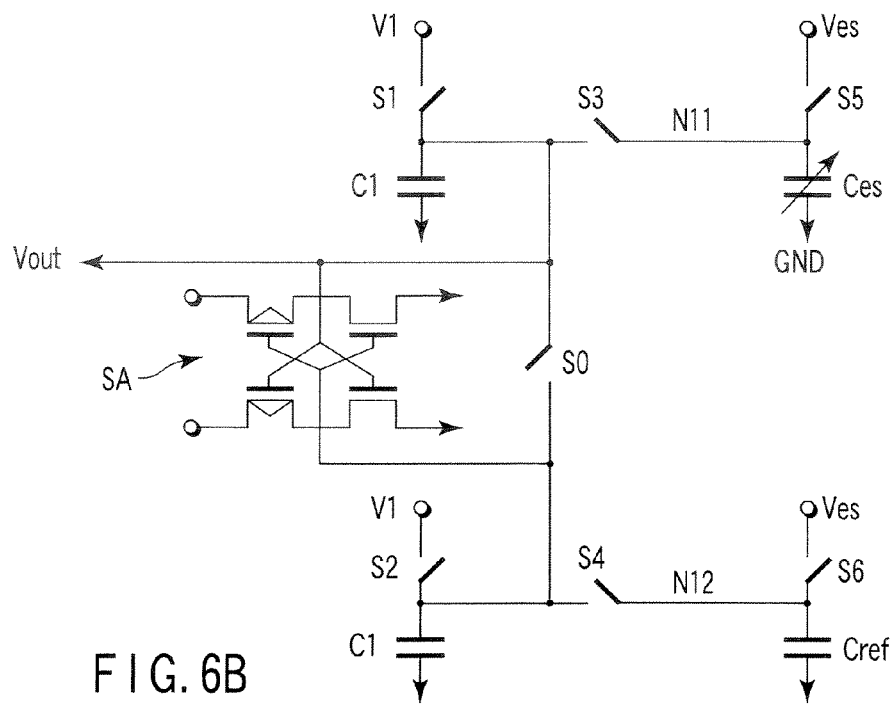
Figure 7:
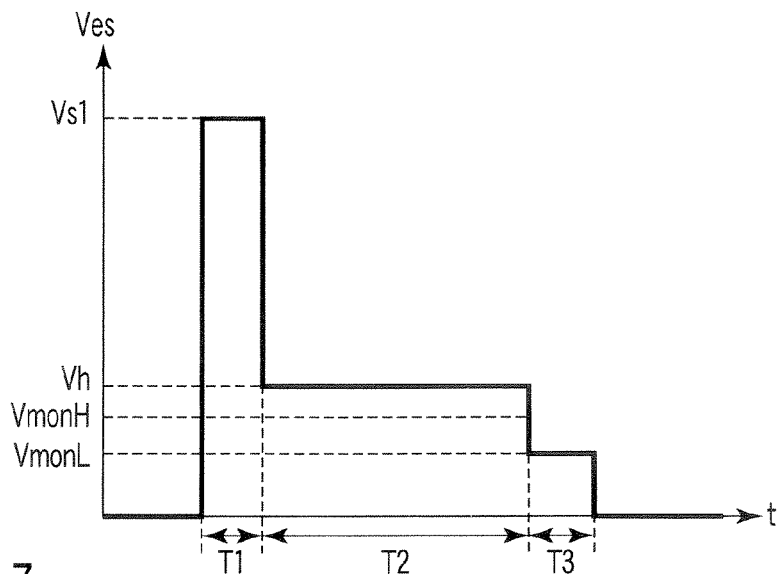
Figure 8:
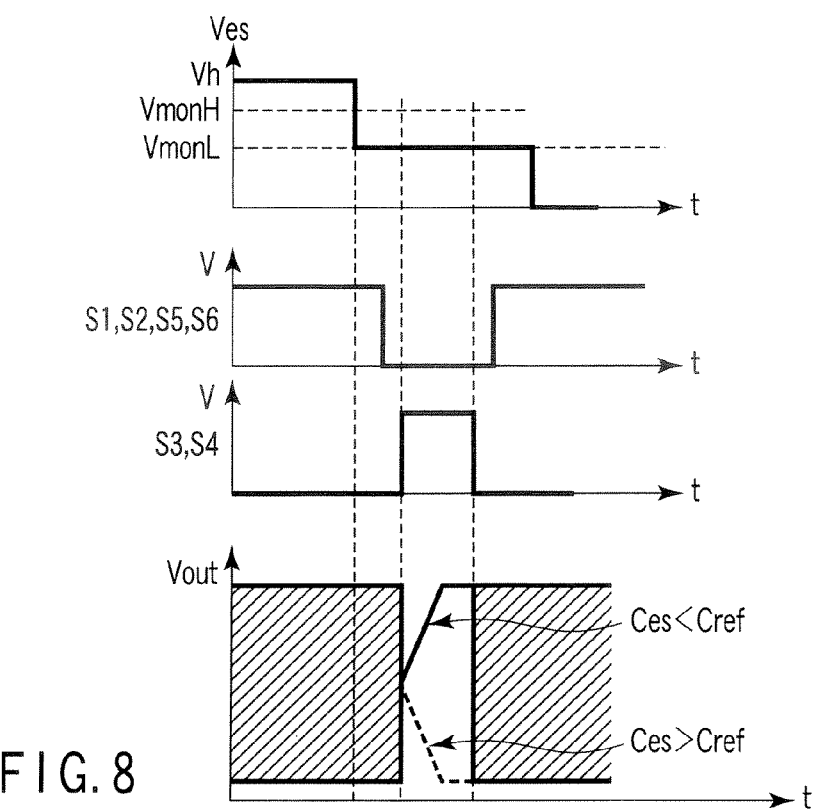
Figure 9:
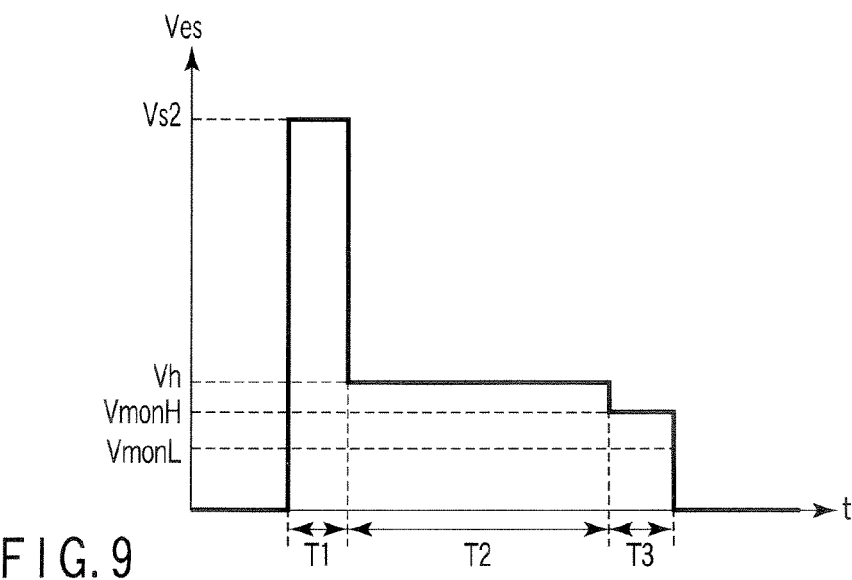
Figure 10:
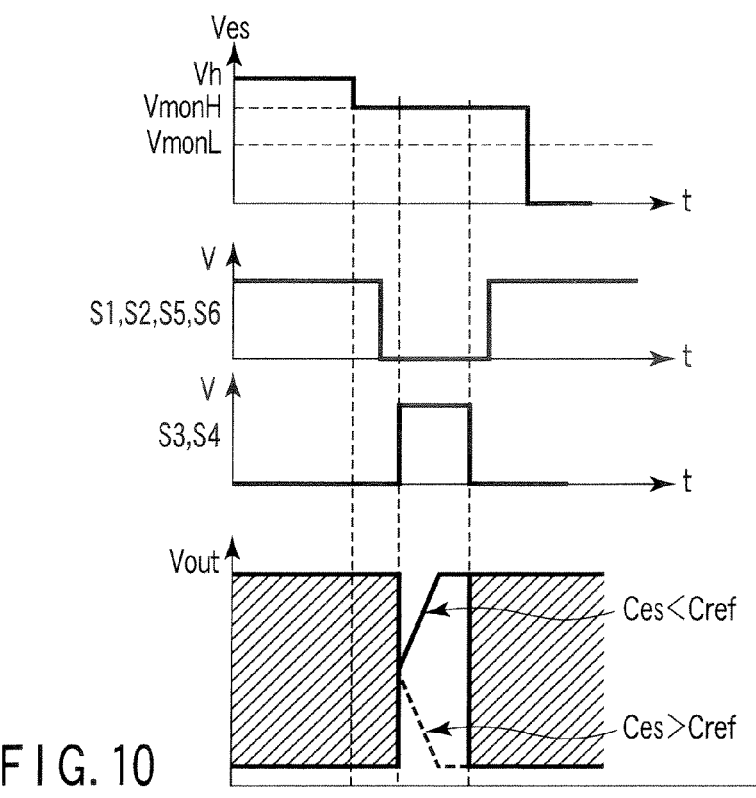
Figure 11A:
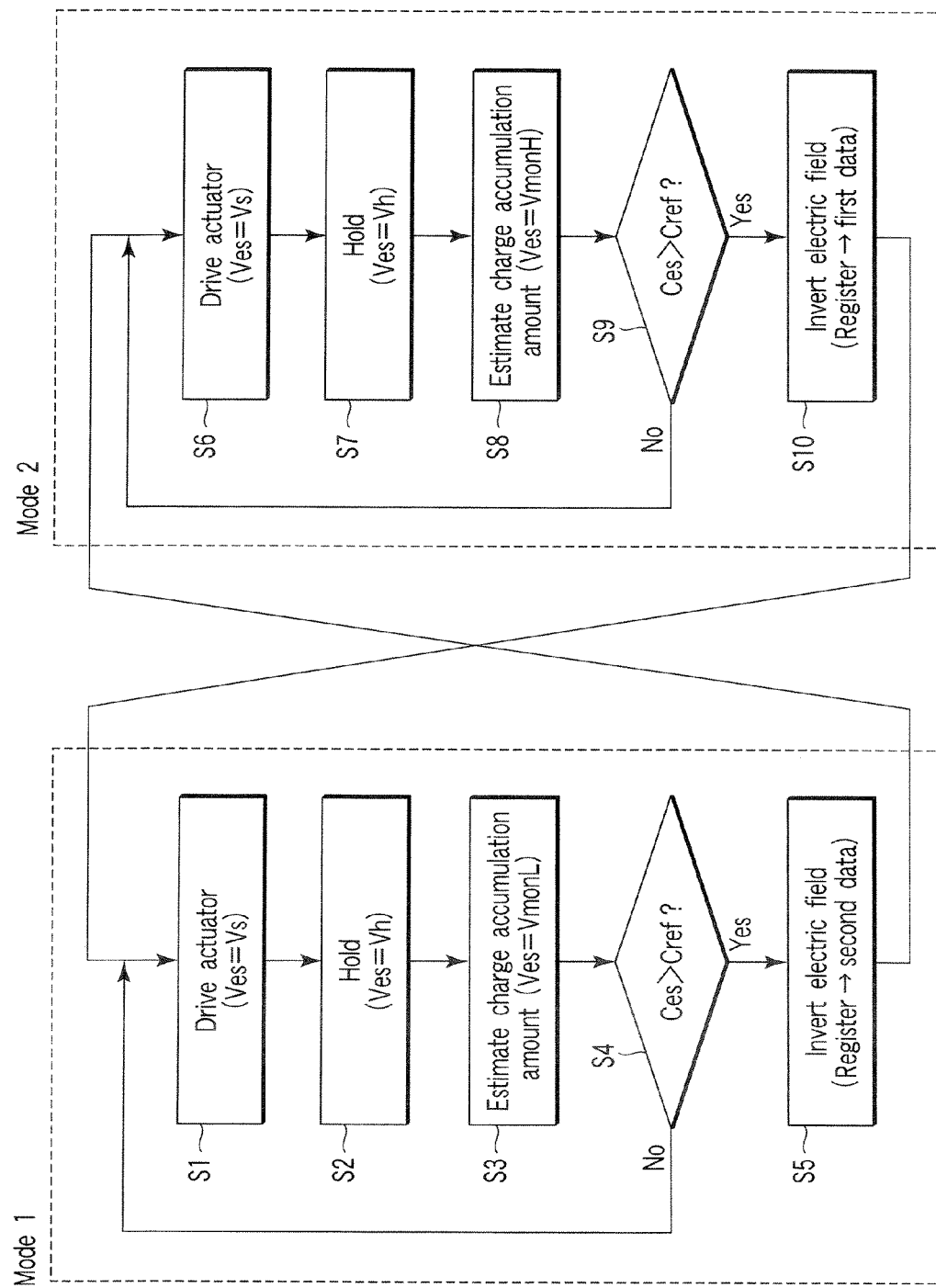
Figure 11B:
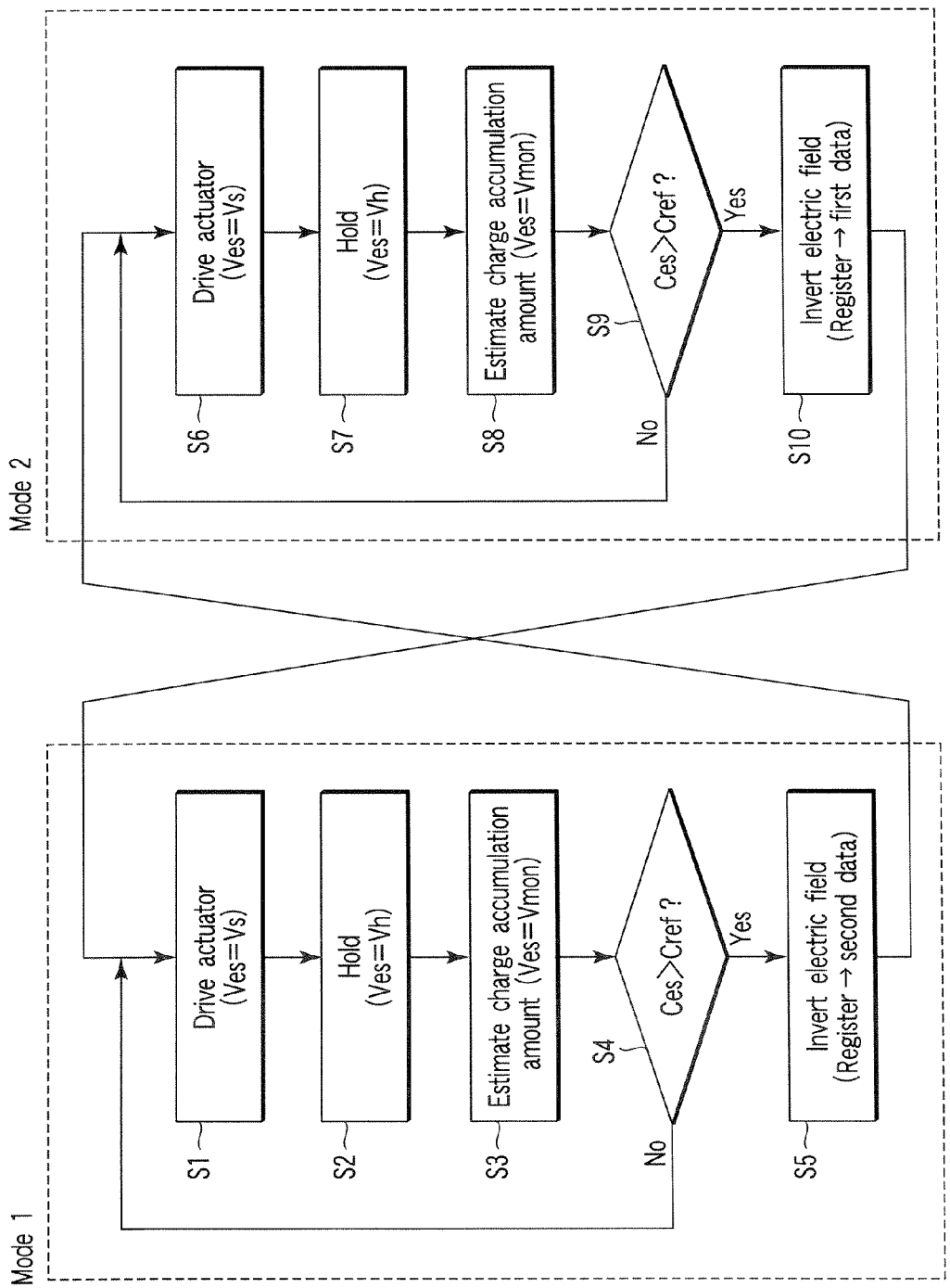
Figure 11C:
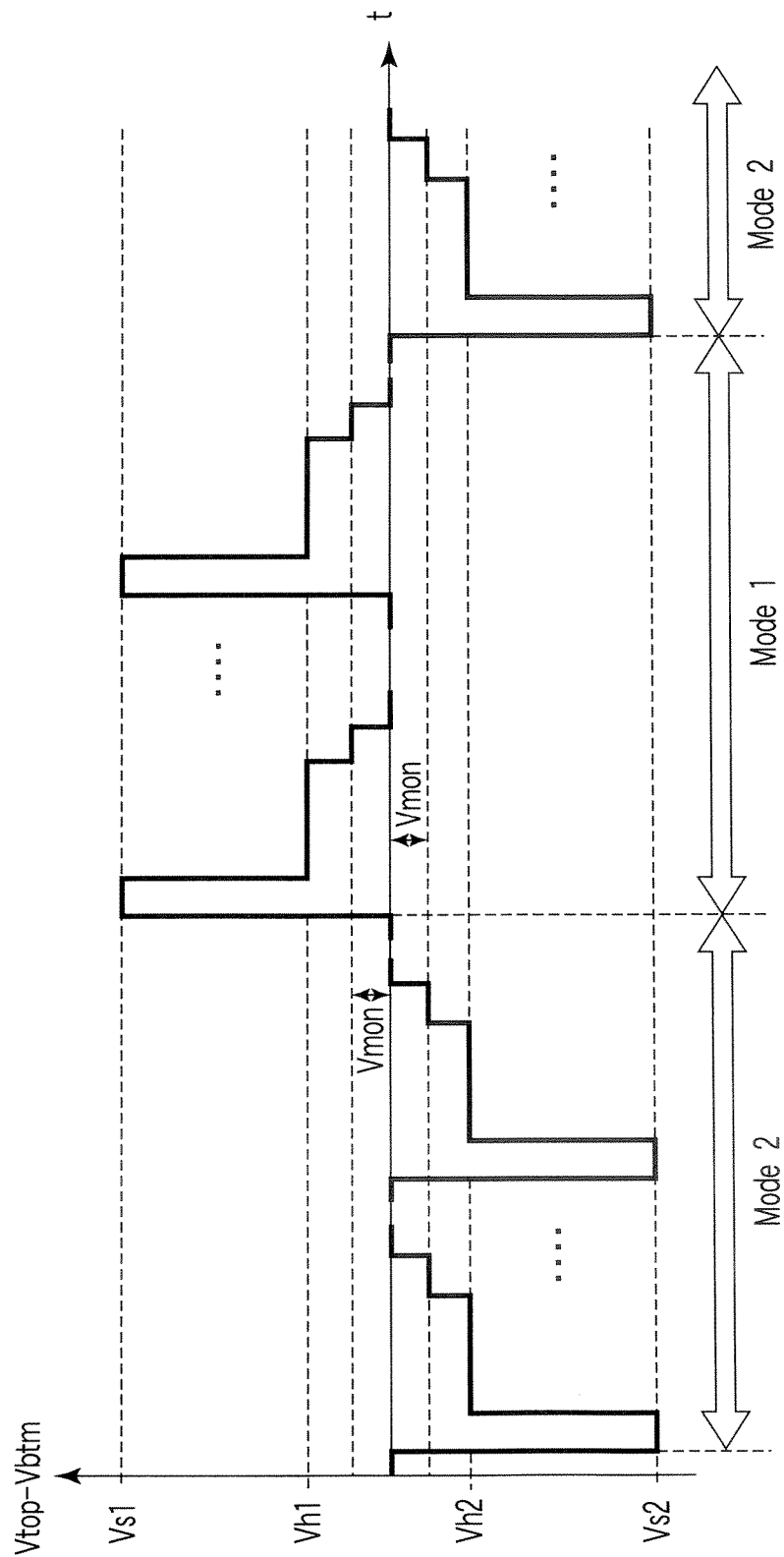
Figure 11E:
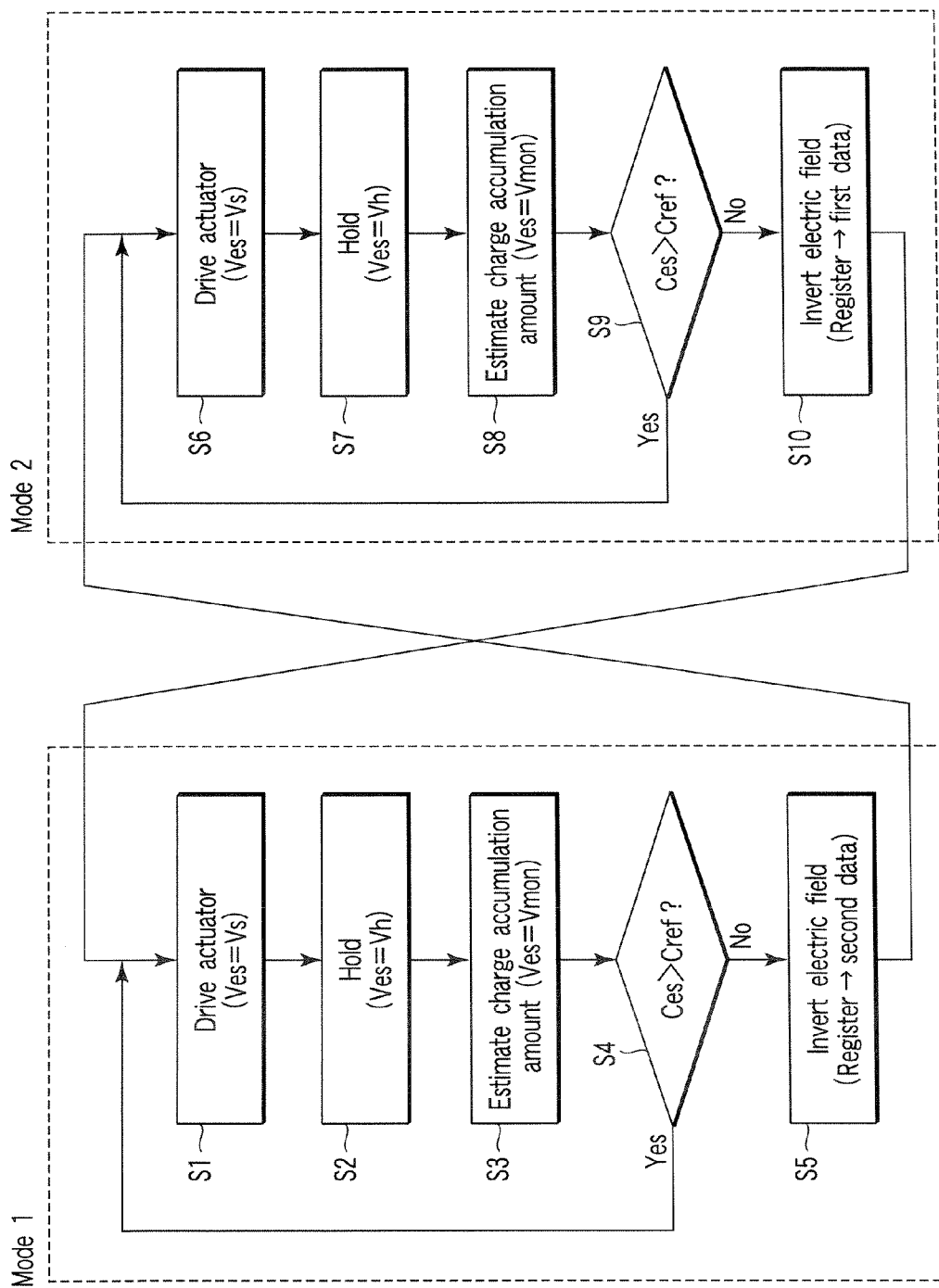
Figure 12A:
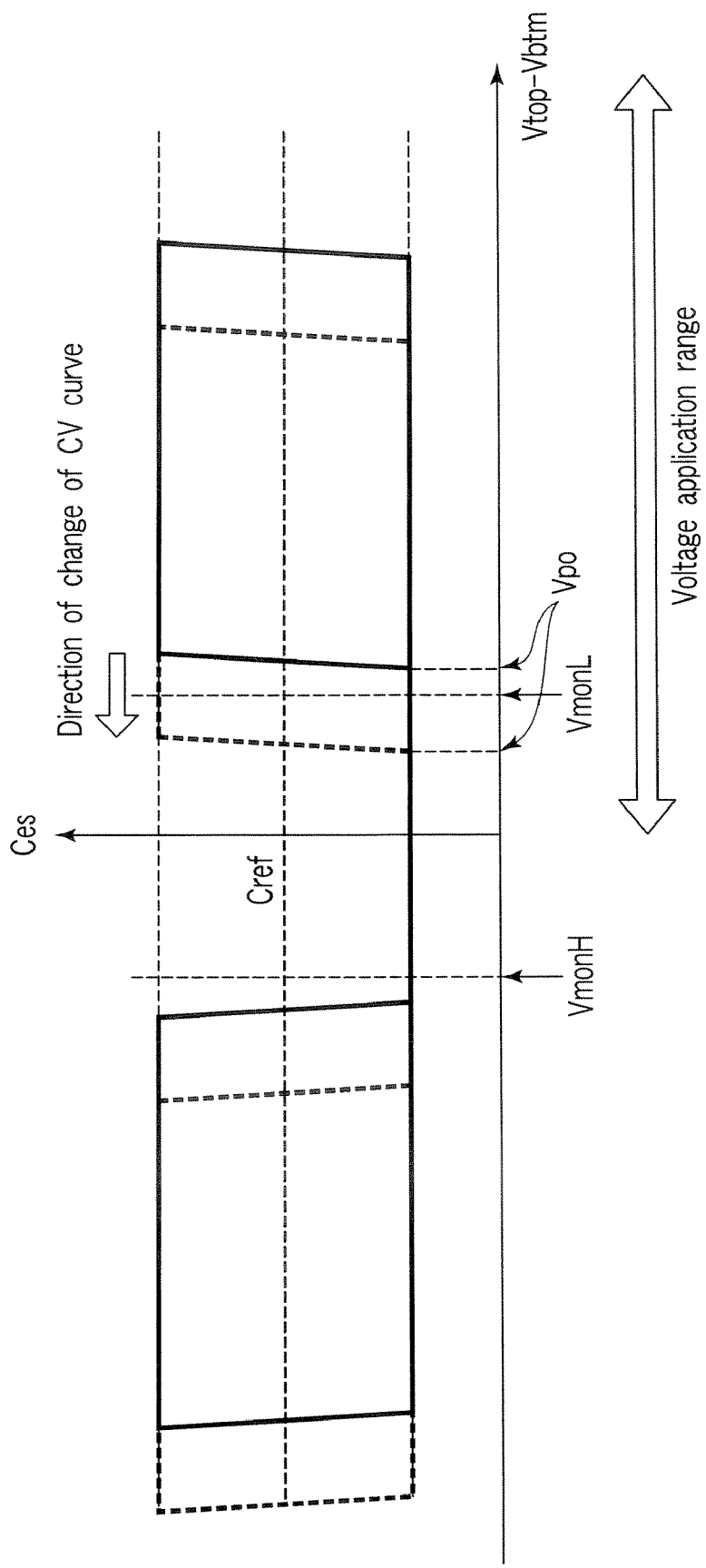
Figure 12B:
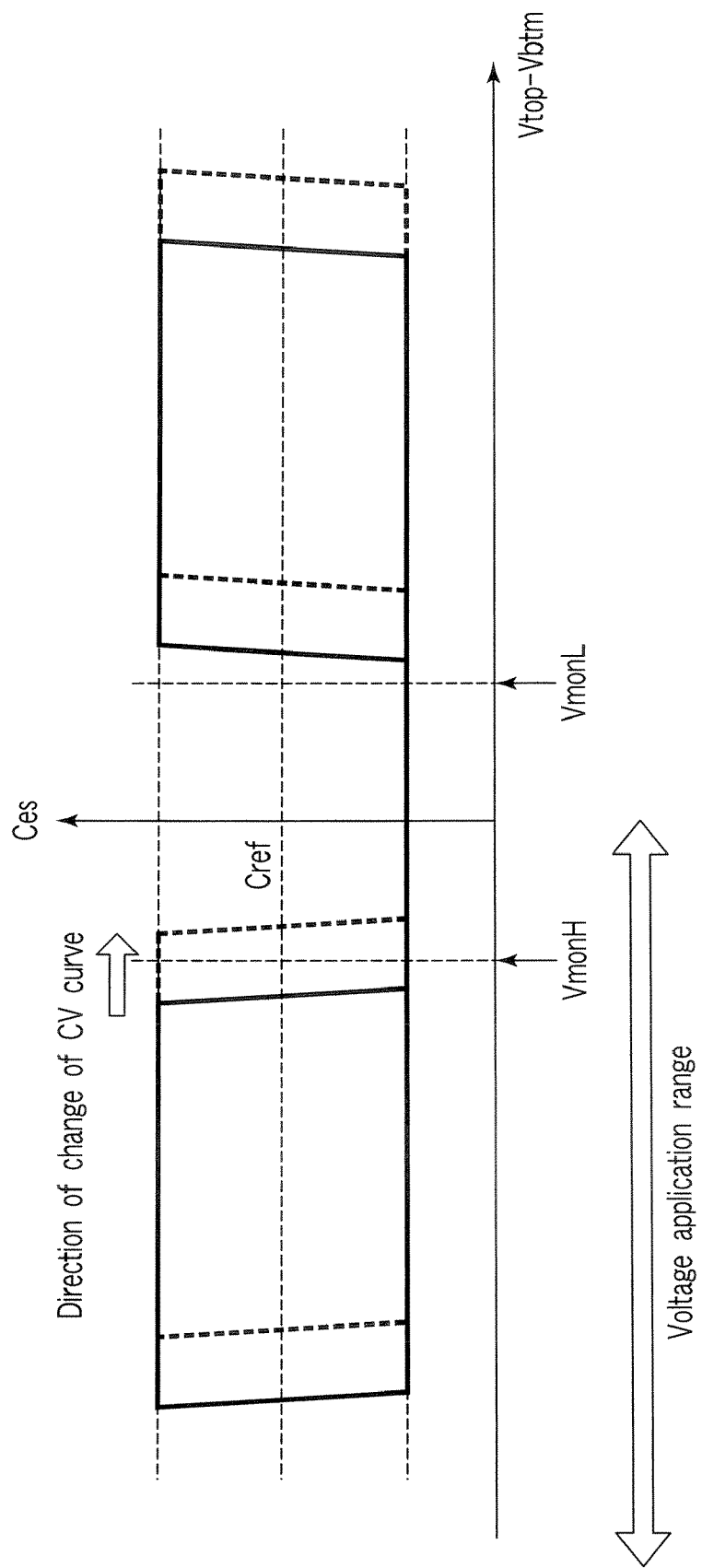
Figure 13:
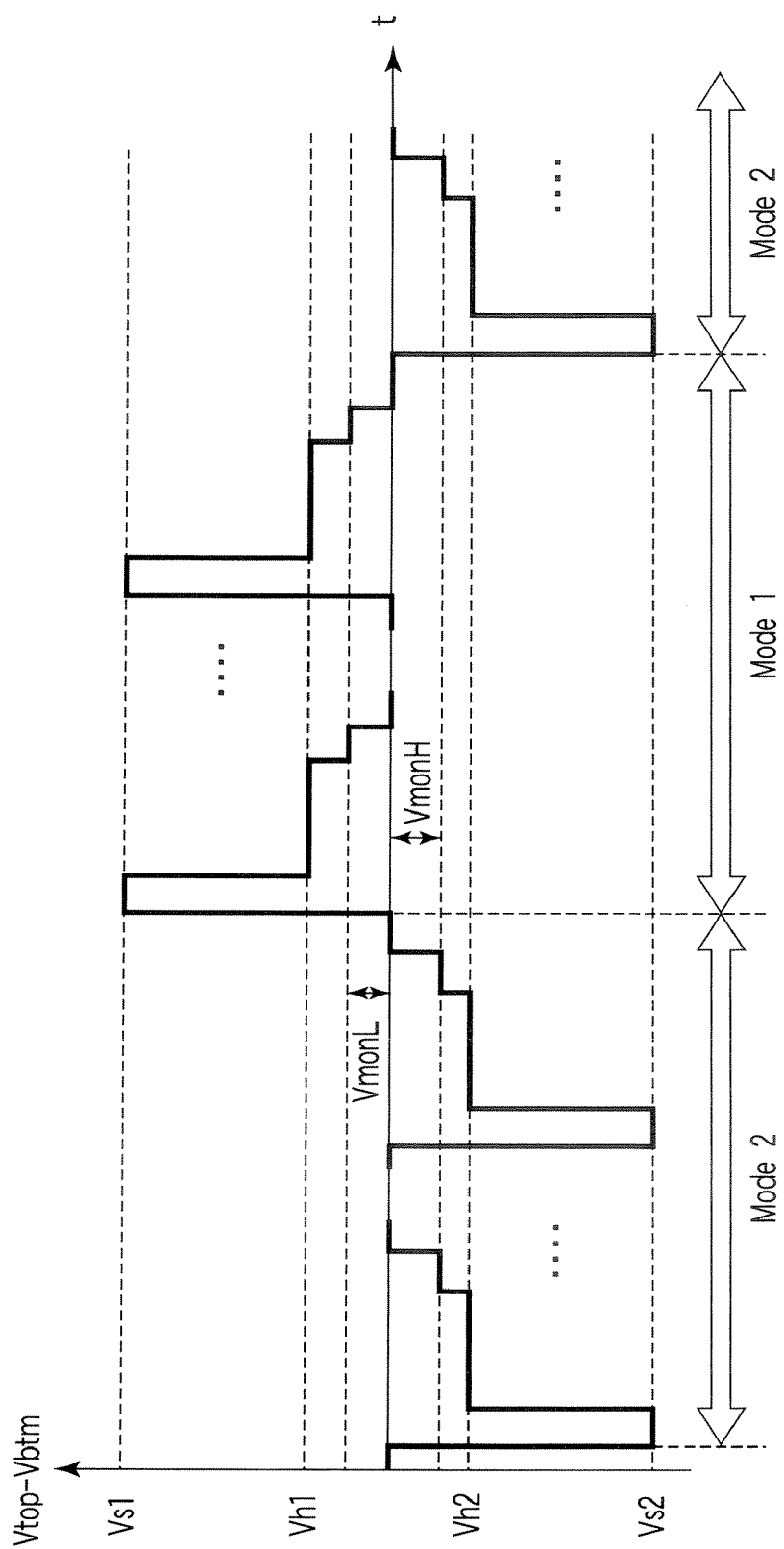
Figure 14:
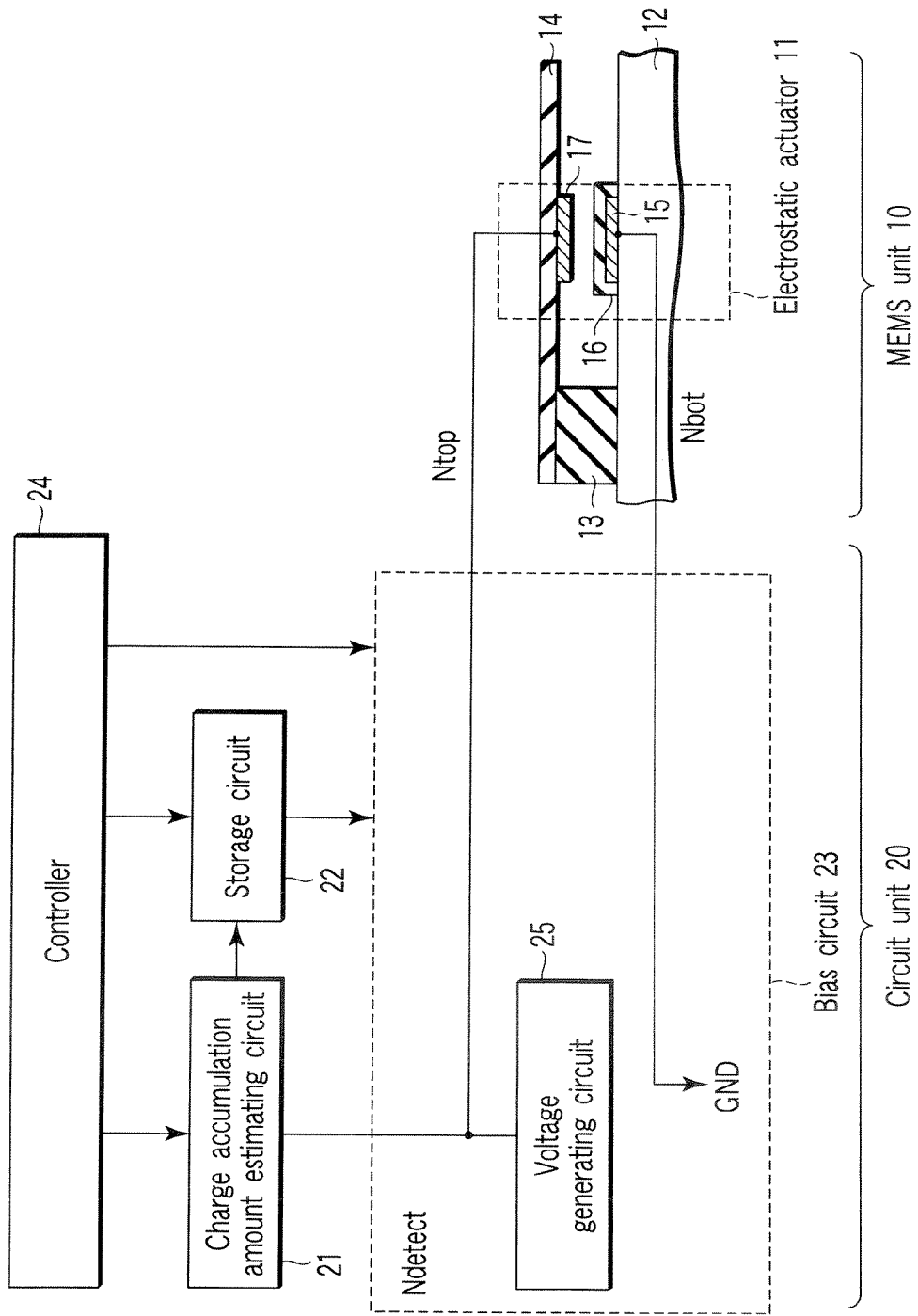
Figure 15:
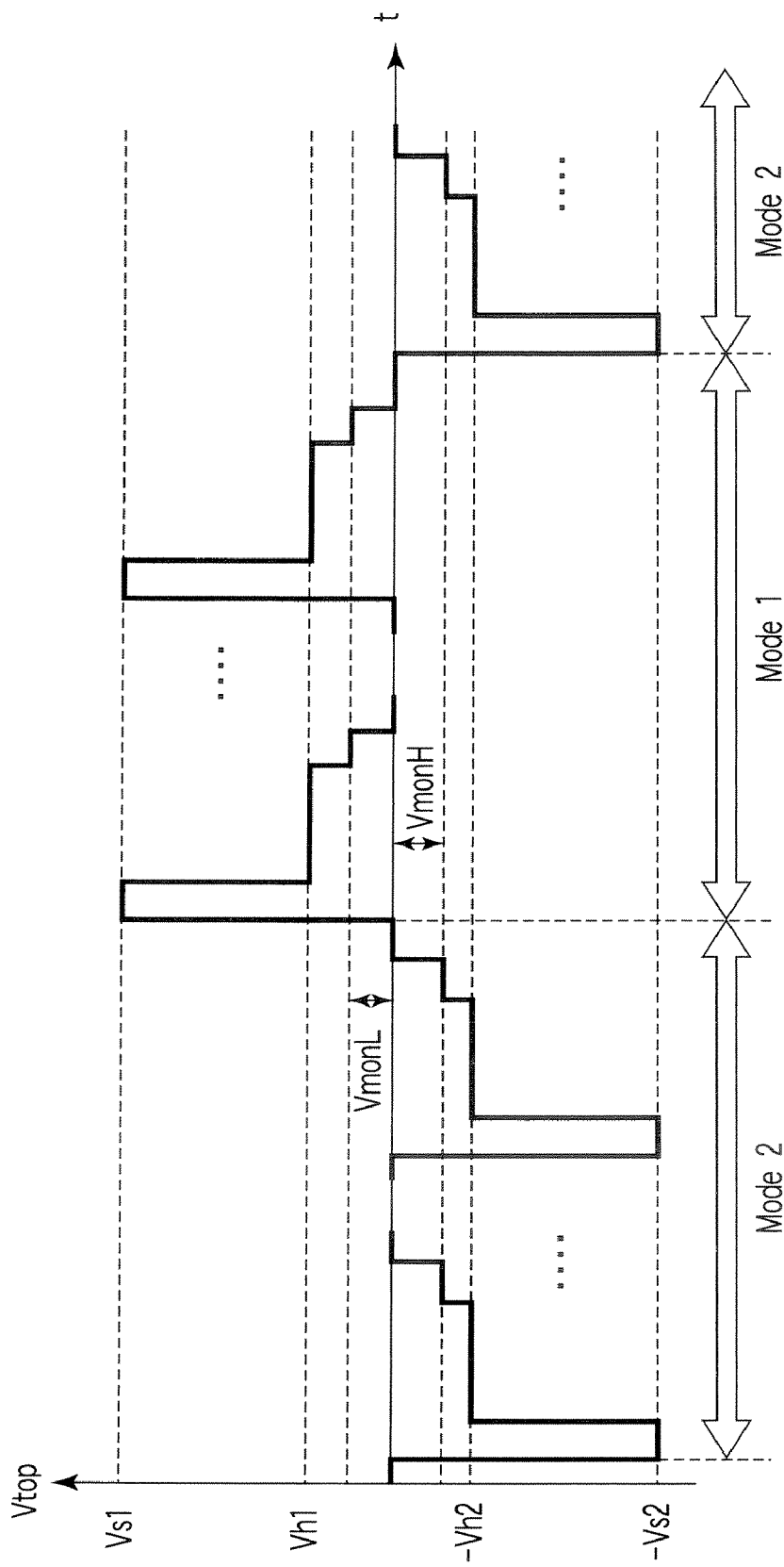
Figure 17:
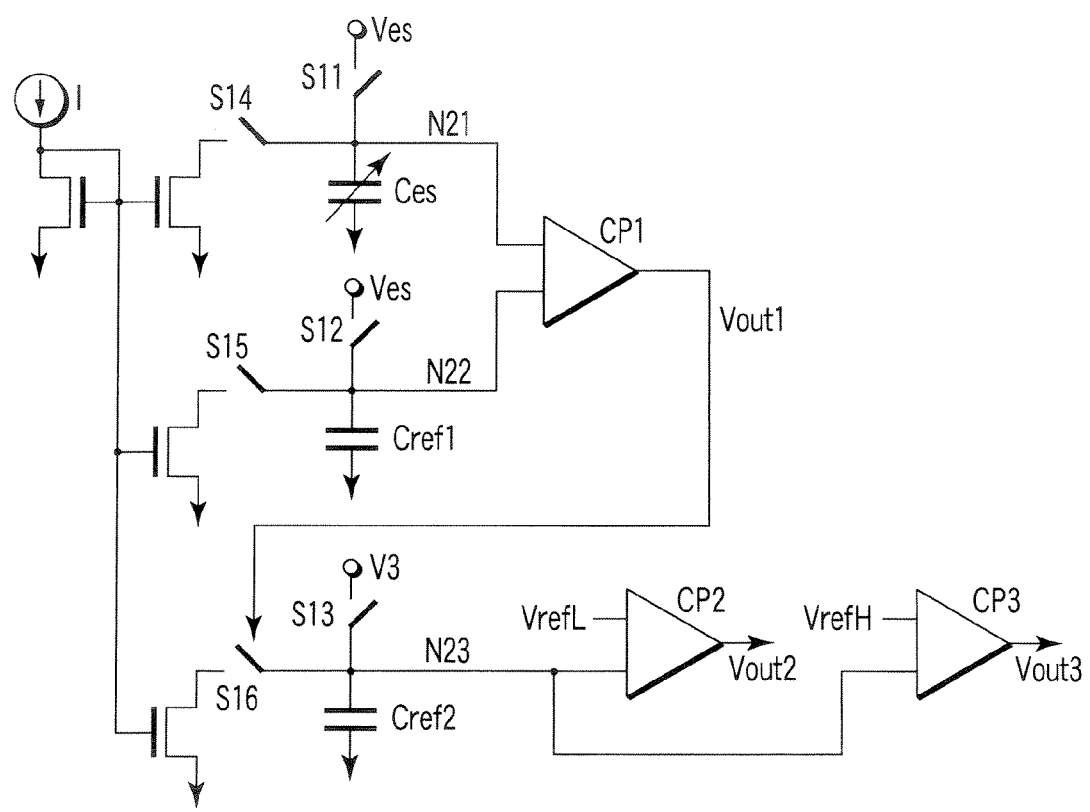
Figure 19:
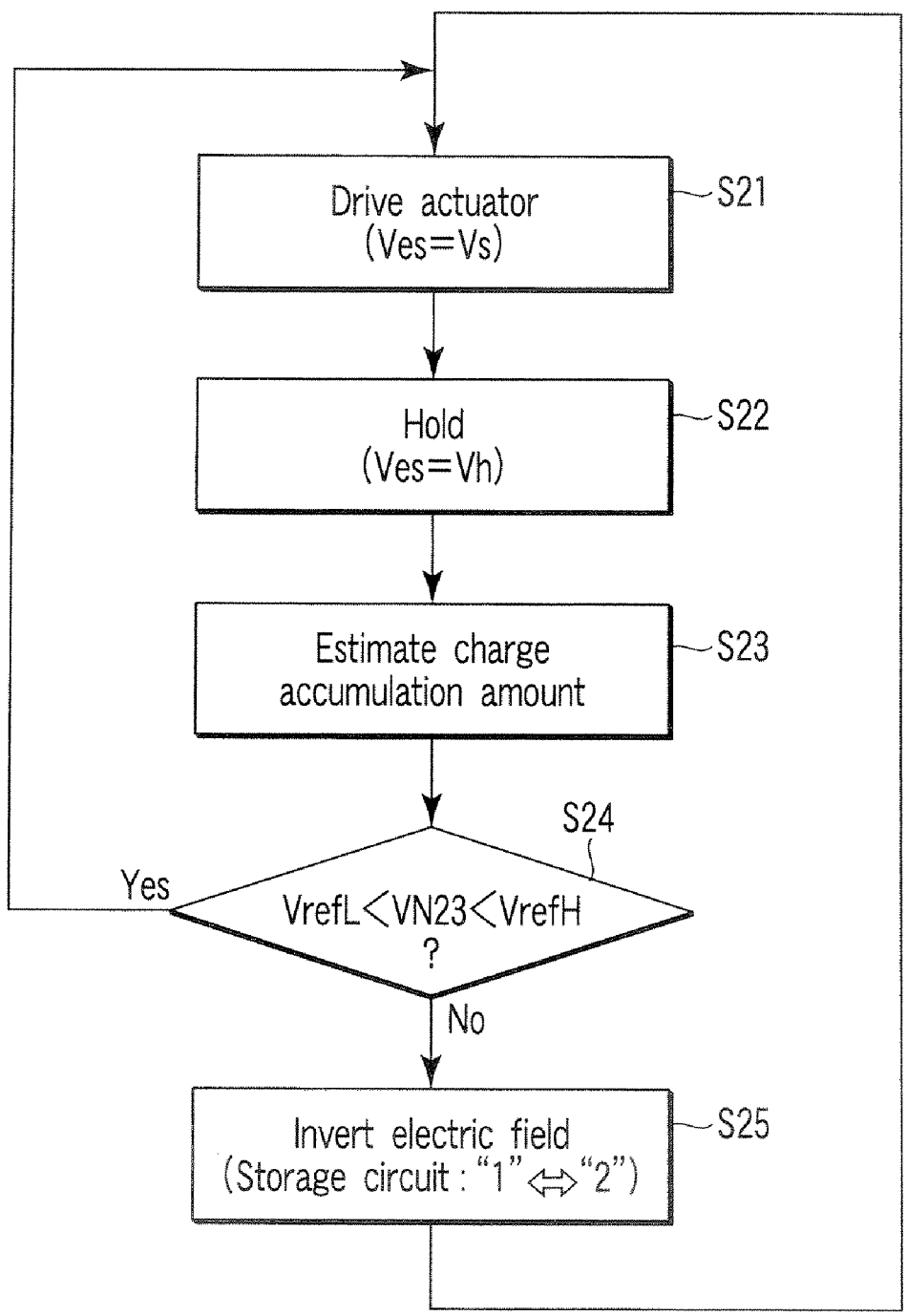
Figure 20A:
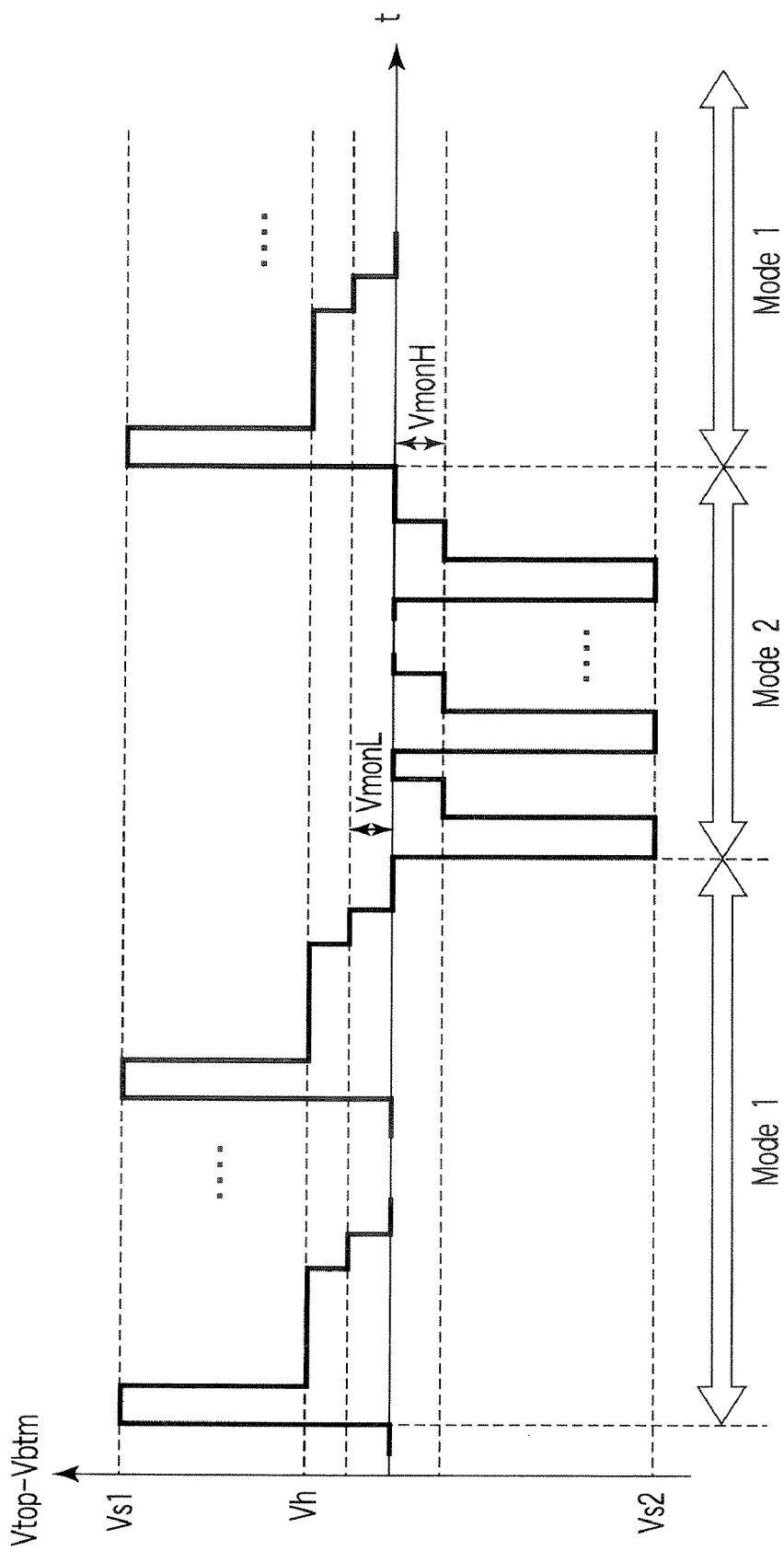
Figure 20B:
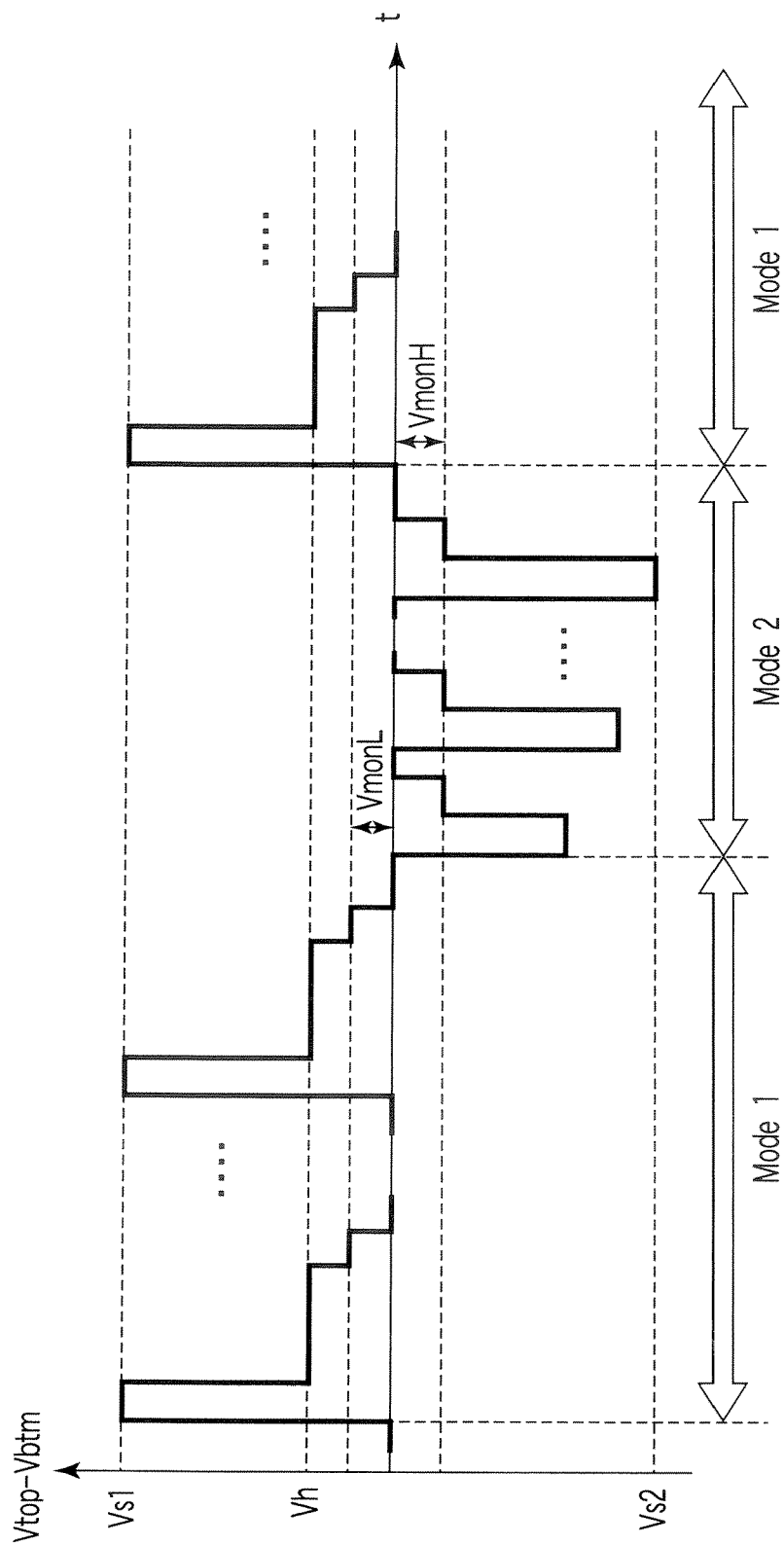
Figure 20C:
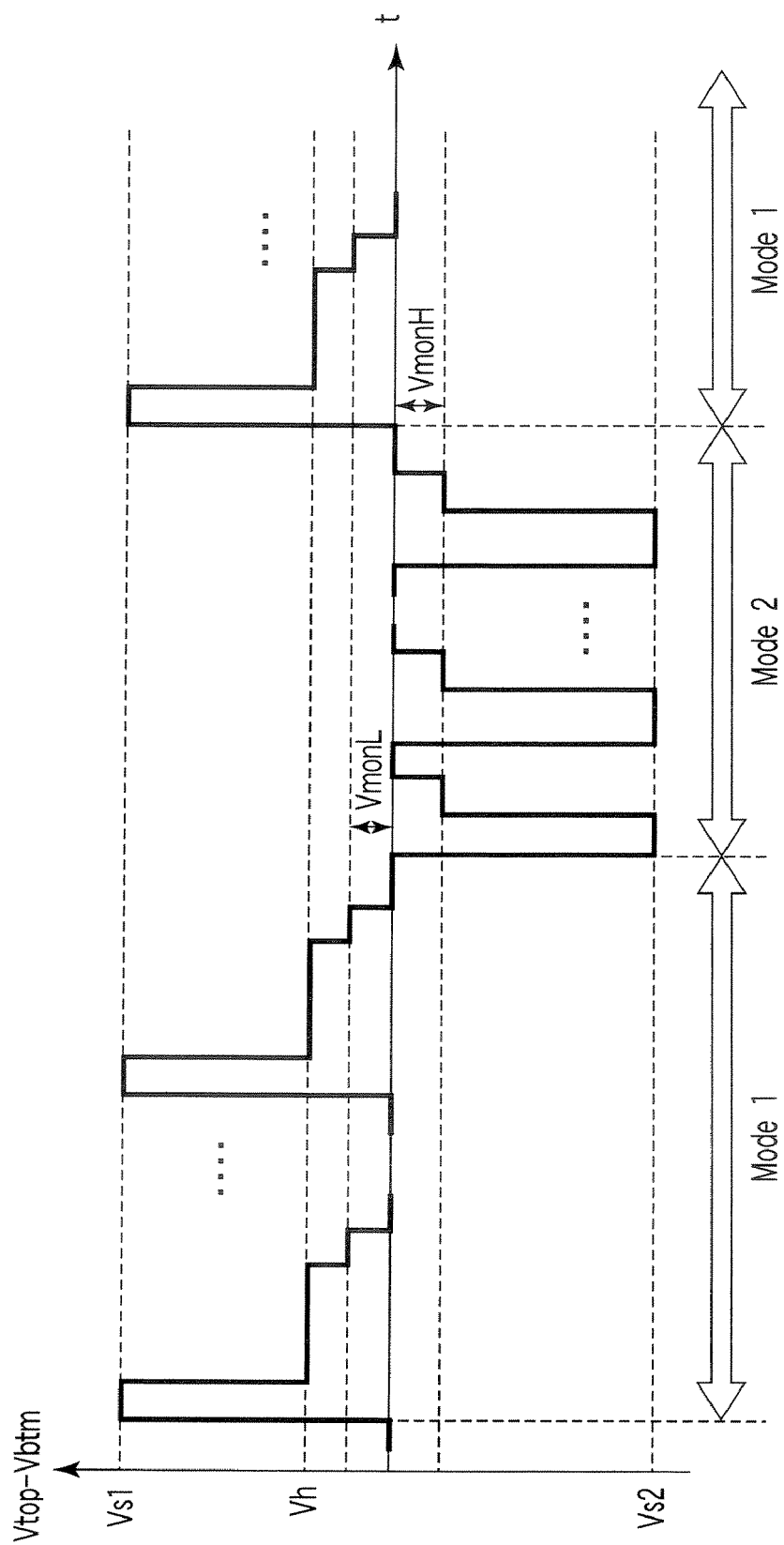
Figure 20D:
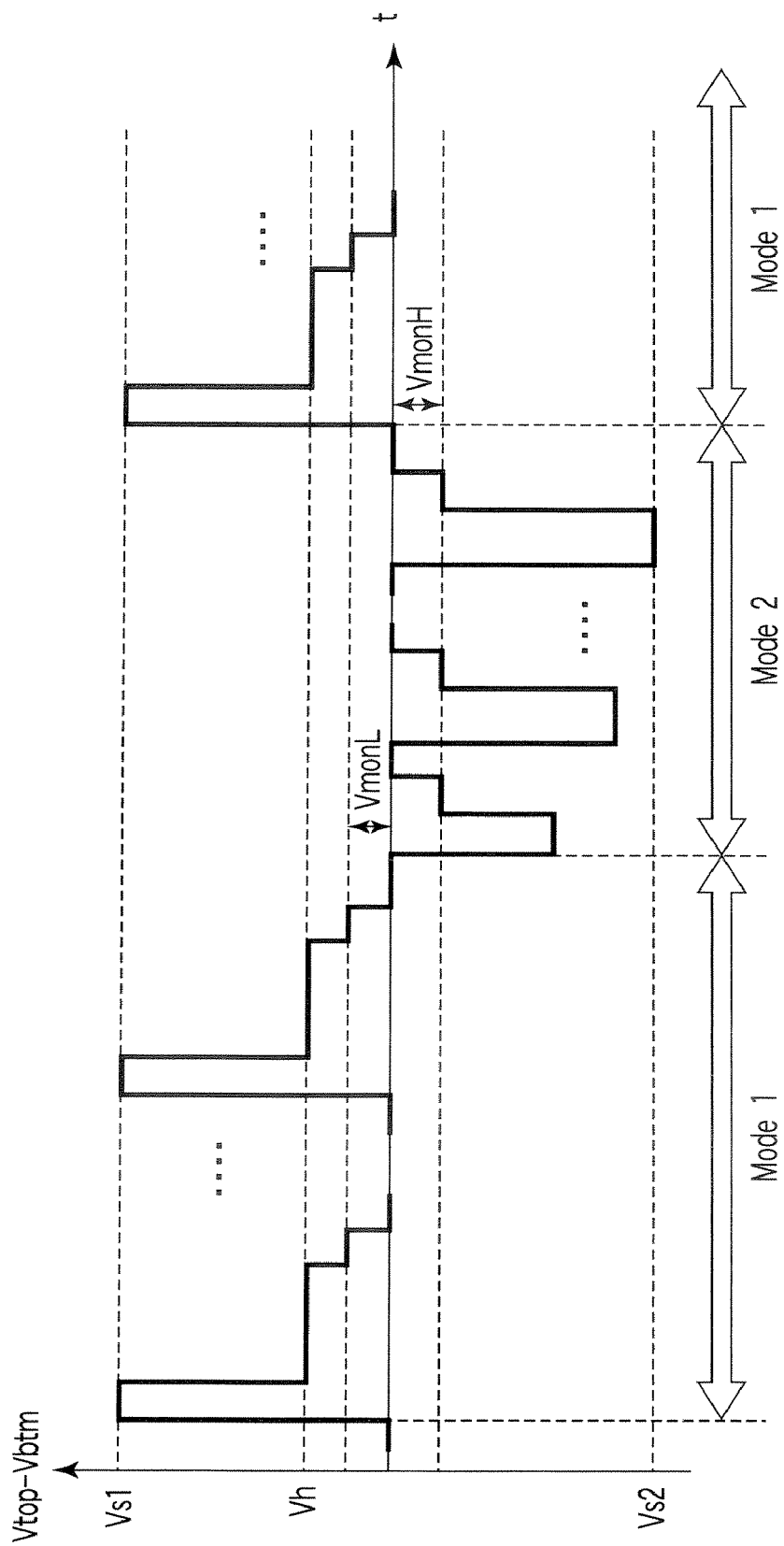
Figure 21:
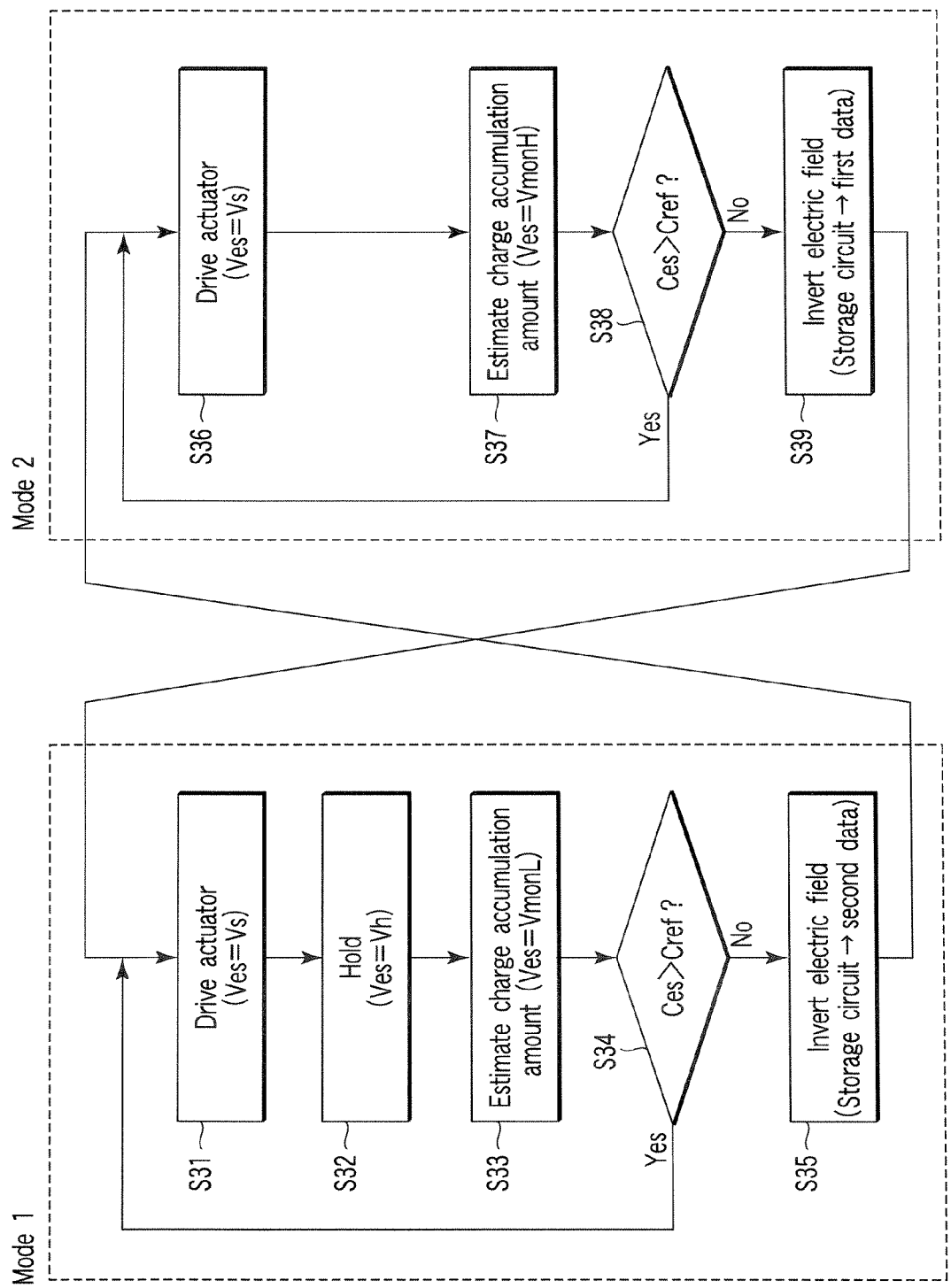
Figure 22A:
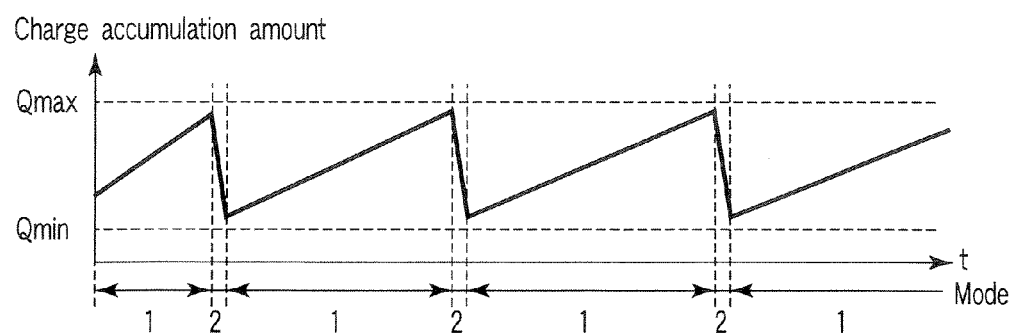
Figure 22B:
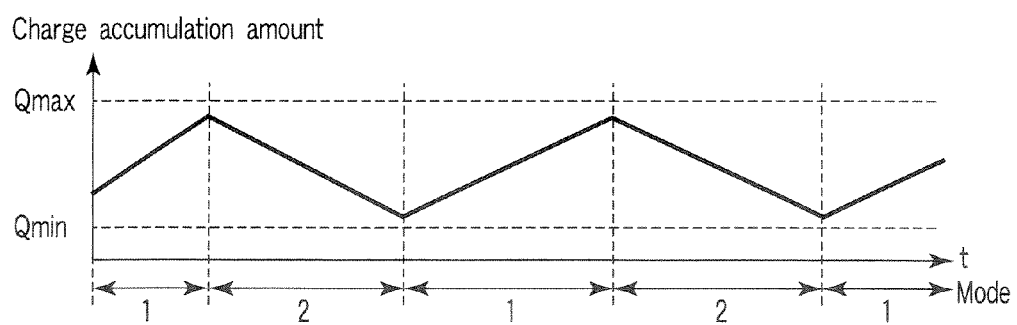
Figure 23:
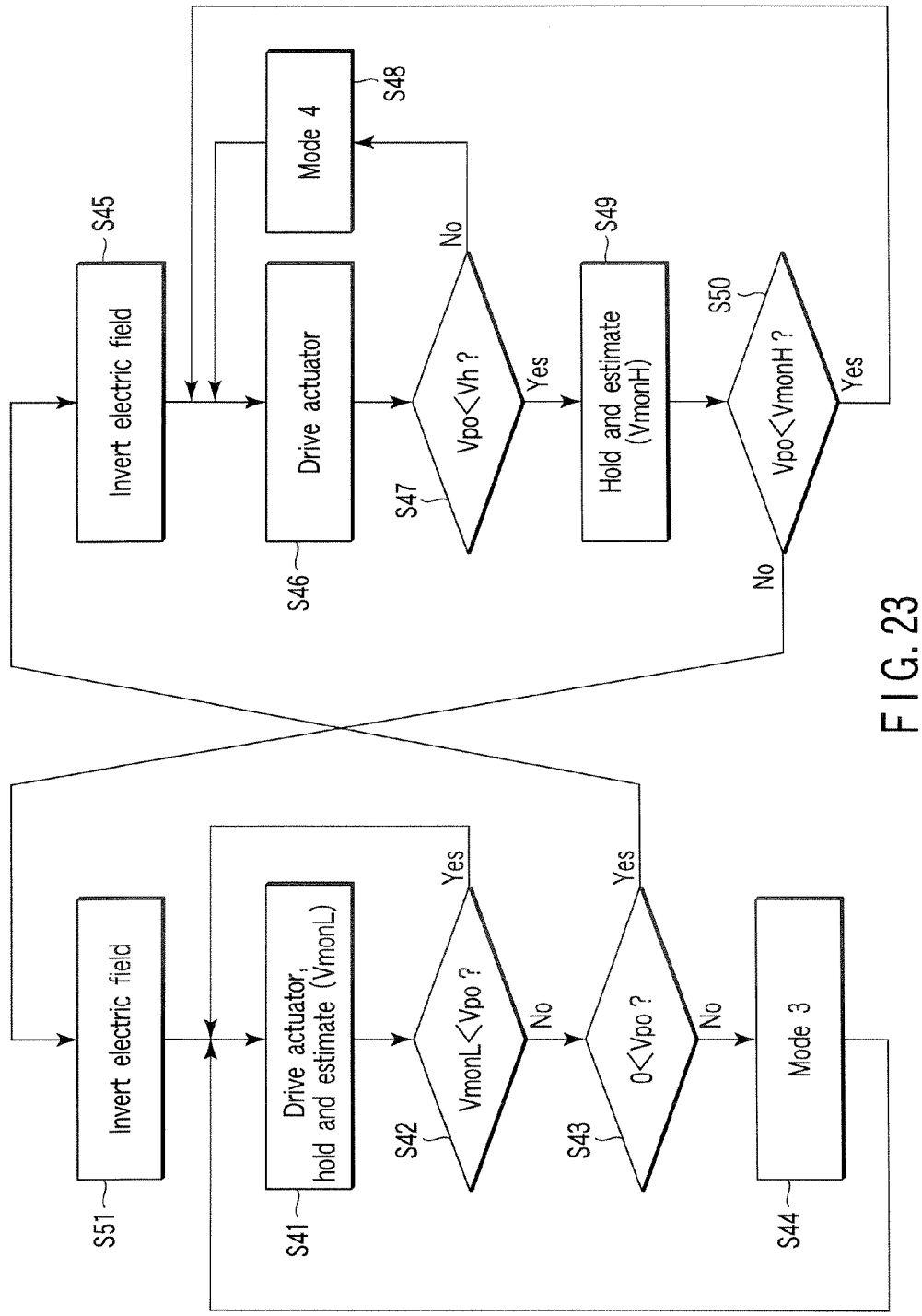
Figure 24:
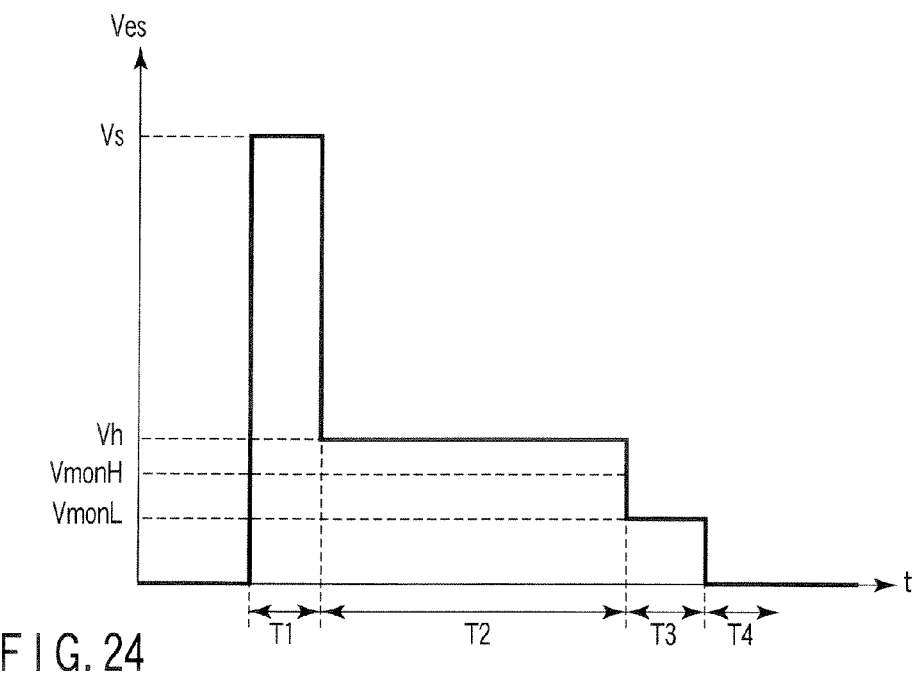
Figure 25:
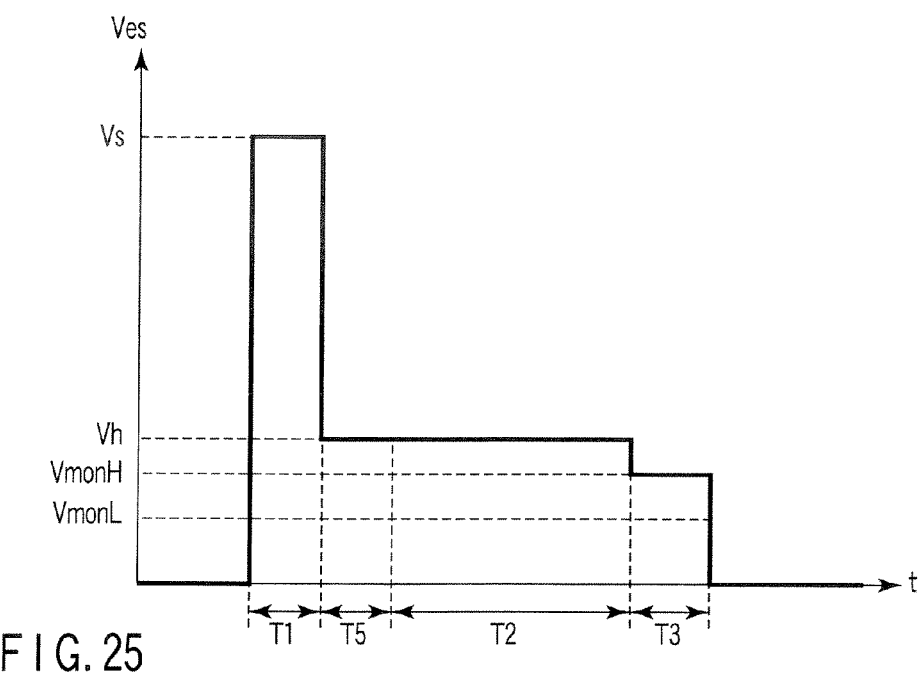
Figure 27A:
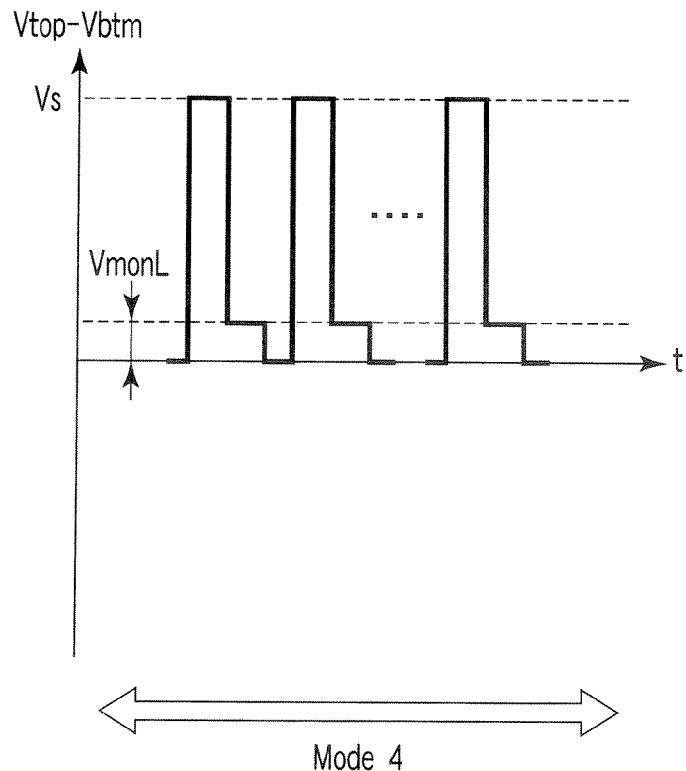
Figure 27B:
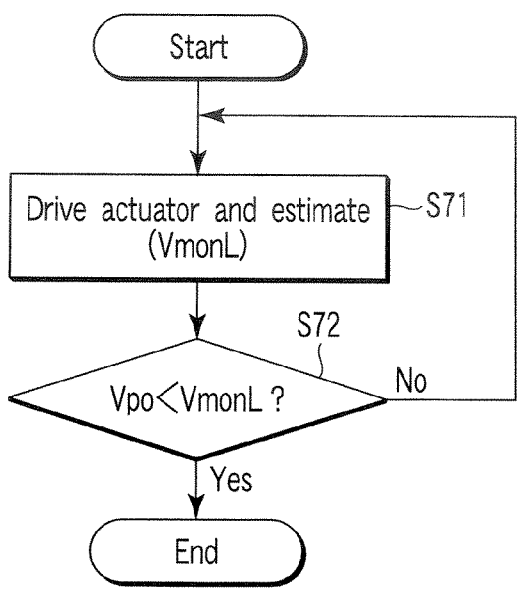
Figure 28:
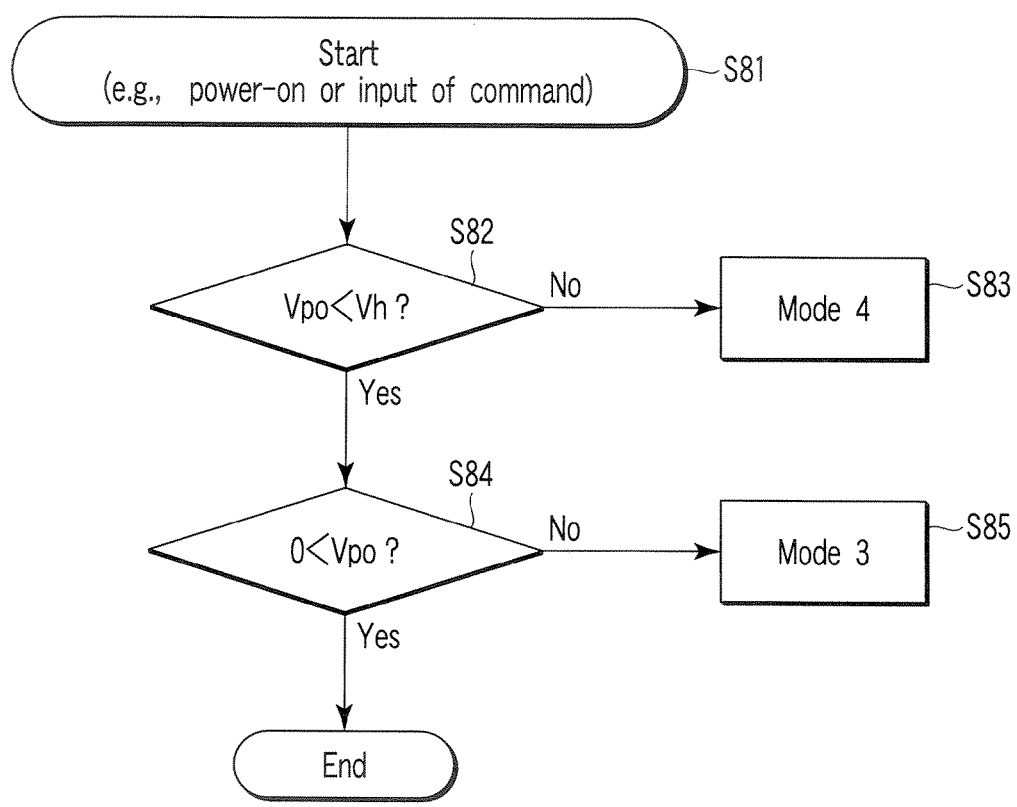
Figure 29:
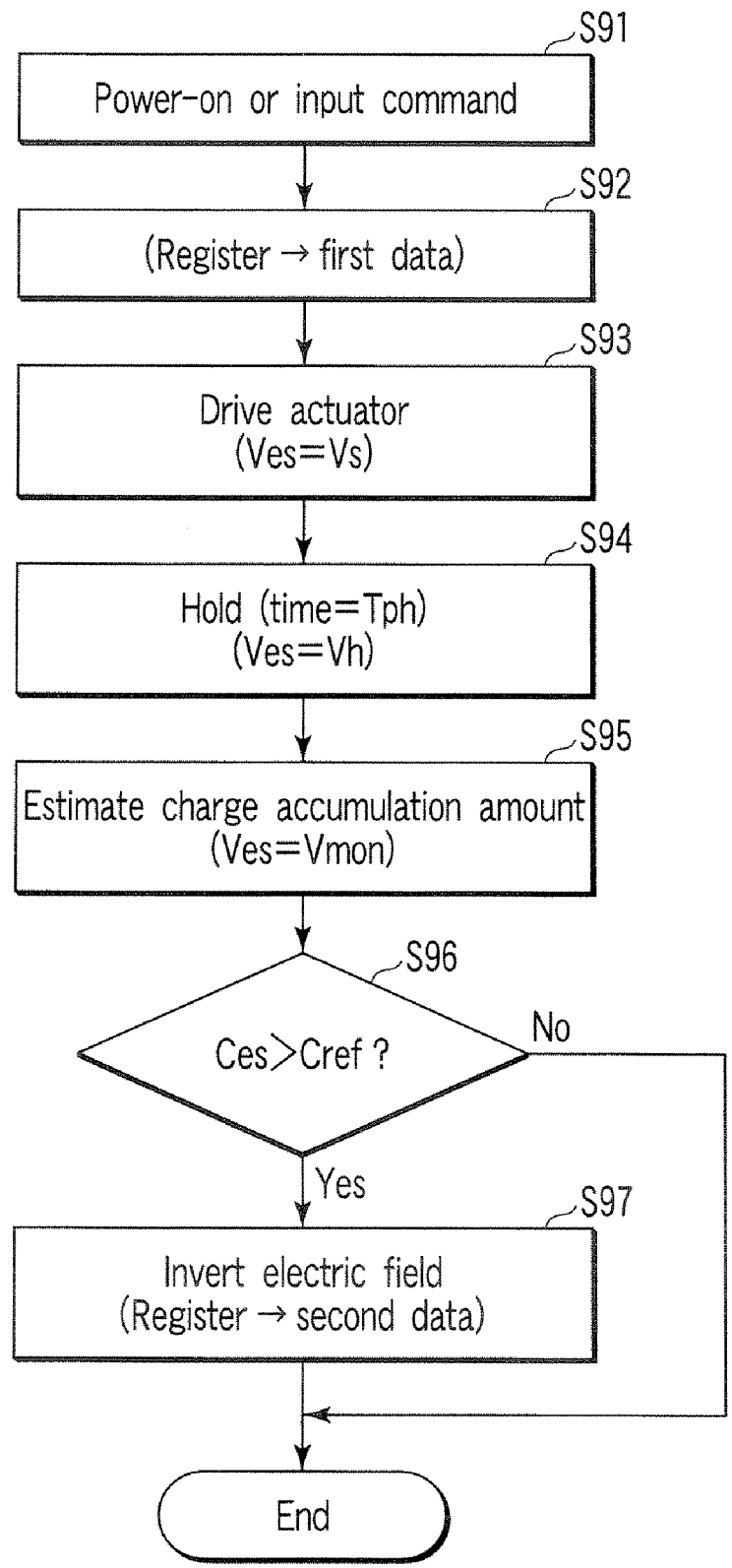
Figure 30B:
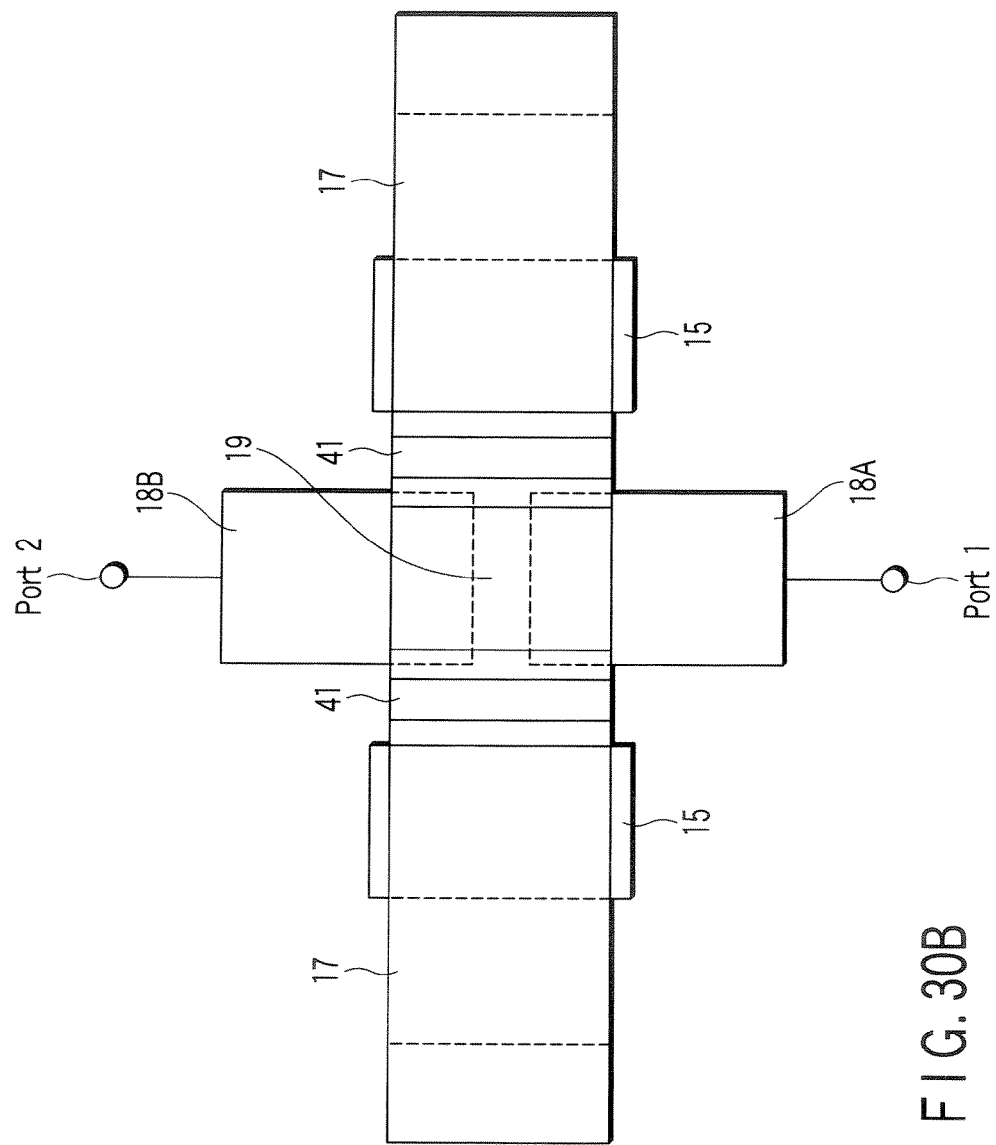

is a curve showing CV characteristics when the voltage Vs is applied to the top electrode and the bottom electrode is set at the ground voltage in the electrostatic actuator (a case of a second kind of charge injection);

FIG. 1D is a curve showing CV characteristics when the voltage Vs is applied to the bottom electrode and the top electrode is set at the ground voltage in the electrostatic actuator (a case of the second kind of charge injection);

FIG. 1E is a schematic diagram showing the configuration of a semiconductor integrated circuit which achieves embodiments of the present invention;

FIG. 2 is a sectional view of a MEMS unit when the electrostatic actuator in the embodiments is applied to a contact-type switch;

FIG. 3 is a sectional view of the MEMS unit when the electrostatic actuator in the embodiments is applied to a variable capacitor element;

FIG. 4 is a sectional view of the MEMS unit which uses a hybrid actuator combining the electrostatic actuator in the embodiments and an actuator which is not an electrostatic actuator type;

FIG. 5 is a schematic diagram showing the configuration of a semiconductor integrated circuit in a first embodiment of the present invention;

FIG. 6A is a diagram of a charge accumulation amount estimating circuit in the semiconductor integrated circuit in the first embodiment;

FIG. 6B is a diagram of a modification of the charge accumulation amount estimating circuit shown in FIG. 6A;

FIG. 7 is a waveform diagram of an output voltage of a voltage generating circuit in the semiconductor integrated circuit in the first embodiment (mode 1);

FIG. 8 is a voltage waveform diagram in the operation of estimating the charge accumulation amount in the semiconductor integrated circuit in the first embodiment (mode 1);

FIG. 9 is a waveform diagram of an output voltage of the voltage generating circuit in the semiconductor integrated circuit in the first embodiment (mode 2);

FIG. 10 is a voltage waveform diagram in the operation of estimating the charge accumulation amount in the semiconductor integrated circuit in the first embodiment (mode 2);

FIG. 11A is a flowchart showing the operation of the semiconductor integrated circuit in the first embodiment (a case of the first kind of charge injection);

FIG. 11B is a flowchart showing the operation of the semiconductor integrated circuit in the first embodiment (a case of VmonL=VmonH=Vmon in the first kind of charge injection);

FIG. 11C is a waveform diagram of a voltage applied to the top electrode and the bottom electrode in a continuous operation of the semiconductor integrated circuit shown in FIG. 11B;

FIG. 11D is a flowchart showing the operation of the semiconductor integrated circuit in the first embodiment (a case of the second kind of charge injection);

FIG. 11E is a flowchart showing the operation of the semiconductor integrated circuit in the first embodiment (a case of VmonL=VmonH=Vmon in the second kind of charge injection);

FIG. 12A is a diagram showing CV characteristics in the electrostatic actuator of the semiconductor integrated circuit in the first embodiment (mode 1);

FIG. 12B is a diagram showing CV characteristics in the electrostatic actuator of the semiconductor integrated circuit in the first embodiment (mode 2);

FIG. 13 is a waveform diagram of the voltage applied to the top electrode and the bottom electrode in the continuous operation of the semiconductor integrated circuit shown in the first embodiment;

FIG. 14 is a schematic diagram showing the configuration of the semiconductor integrated circuit in a modification of the first embodiment of the present invention;

FIG. 15 is a waveform diagram of the voltage applied to the top electrode and the bottom electrode in the continuous operation of the semiconductor integrated circuit shown in the modification of the first embodiment;

FIG. 16A is a waveform diagram of a bipolar voltage as a hold voltage applied to the top electrode and the bottom electrode in the semiconductor integrated circuit shown in the first embodiment;

FIG. 16B is a voltage waveform diagram showing another modification of the output voltage of the voltage generating circuit in the semiconductor integrated circuit in the first embodiment;

FIG. 17 is a diagram of a charge accumulation amount estimating circuit in a semiconductor integrated circuit in a second embodiment of the present invention;

FIG. 18 is a waveform diagram for a estimation operation of the charge accumulation amount estimating circuit in a semiconductor integrated circuit in the second embodiment;

FIG. 19 is a flowchart showing the operation of the semiconductor integrated circuit in the second embodiment;

FIG. 20A is a waveform diagram of an output voltage of a voltage generating circuit in a third embodiment of the present invention;

FIG. 20B is a waveform diagram of the output voltage as a first modification of the voltage generating circuit in the third embodiment;

FIG. 20C is a waveform diagram of the output voltage as a second modification of the voltage generating circuit in the third embodiment;

FIG. 20D is a waveform diagram of the output voltage as a third modification of the voltage generating circuit in the third embodiment;

FIG. 21 is a flowchart showing the operation of the semiconductor integrated circuit in the third embodiment;

FIG. 22A is a schematic diagram showing a change in the amount of the charge accumulated in an insulating film in the semiconductor integrated circuit in the third embodiment;

FIG. 22B is a schematic diagram showing a change in the amount of the charge accumulated in the insulating film in the semiconductor integrated circuit in the first embodiment;

FIG. 23 is a flowchart showing the operation of a semiconductor integrated circuit in a fourth embodiment of the present invention;

FIG. 24 is a diagram of a first output waveform of the voltage generating circuit in the semiconductor integrated circuit in the fourth embodiment;

FIG. 25 is a diagram of a second output waveform of the voltage generating circuit in the semiconductor integrated circuit in the fourth embodiment;

FIG. 26A is a voltage waveform diagram in a mode 3 in FIG. 23;

FIG. 26B is a flowchart in the mode 3 in FIG. 23;

FIG. 27A is a voltage waveform diagram in a mode 4 in FIG. 23;

FIG. 27B is a flowchart in the mode 4 in FIG. 23;

FIG. 28 is a flowchart showing the operation of a test mode provided in a semiconductor integrated circuit in a fifth embodiment of the present invention;

FIG. 29 is a flowchart showing the operation of a test mode provided in a semiconductor integrated circuit in a sixth embodiment of the present invention;

FIG. 30A is a schematic diagram showing the configuration of a semiconductor integrated circuit including a MEMS variable capacitor element in a seventh embodiment of the present invention;

FIG. 30B is a plan view of the MEMS variable capacitor element in the seventh embodiment;

FIG. 31A is a schematic diagram showing the configuration of a semiconductor integrated circuit including a MEMS switch in an eighth embodiment of the present invention; and FIG. 31B is a plan view of the MEMS switch in the eighth embodiment.

DETAILED DESCRIPTION OF THE INVENTION

Hereinafter, embodiments of this invention will be described in reference to the drawings. In the description, like reference signs are assigned to like parts throughout the drawings.

There are normally the following two methods of driving an electrostatic actuator to bring a top electrode down, that is, to move the top electrode to the side of a bottom electrode and bring the top electrode into contact with an insulating film on the bottom electrode.

(a) A voltage Vs is applied to the top electrode, and the bottom electrode is set at a ground voltage.

(b) The voltage Vs is applied to the bottom electrode, and the top electrode is set at the ground voltage.

As described above, since a high electric field is applied to the insulating film disposed on the bottom electrode when the top electrode is down, dielectric charging occurs. However, because there is a difference between (a) and (b) in the direction of the electric field applied to the insulating film, the sign of the charge injected into the insulating film is different. For example, when a laminated film of a silicon nitride film (SiN) and a silicon oxide film (SiO) is employed as the insulating film, an electron is injected into the insulating film, and a pull-out voltage for separating the top electrode from the insulating film drops, in the case of (a). How CV characteristics change in this case is shown in FIG. 1A. Here, a voltage "Vtop−Vbtm" is a potential difference between the top electrode and the bottom electrode, and a capacitance Ces is a capacitance of the insulating film disposed between the top electrode and the bottom electrode. Moreover, in the case of (b), the CV characteristics change as shown in FIG. 1B. Therefore, in both cases, a pull-out voltage Vpo moves in a direction to decrease with respect to the absolute value of the voltage "Vtop−Vbtm", when Vs>0. Thus, if the operation is continued with no change of the sign of the voltage "Vtop−Vbtm", stiction occurs in the end. The point of the embodiments of the present invention is that the above-mentioned biasing methods of (a) and (b) are used suitably to the amount of the charge injected in the insulating film in order to prevent a fault due to the stiction. In other words, the point is that the direction of the electric field between the top electrode and the bottom electrode is changed in accordance with the amount of the charge injected in the insulating film in order to keep the amount of the charge injected in the insulating film within a given range.

In addition, although there is a possibility that the direction of the electric field applied to the insulating film and the sign of the charge injected into the insulating film are different depending on the kind of insulating film and the place of a trap, the description will hereinafter be given on the assumption of a case where the CV characteristics change mainly as shown in FIGS. 1A and 1B. Such a case will be called a first kind of charge injection where the pull-out voltage Vpo moves in the direction to decrease with respect to the absolute value of the voltage "Vtop−Vbtm". However, it is obvious that the embodiments of the present invention can also be applied to a case where the CV characteristics change as shown in FIGS. 1C and 1D, that is, a case where the pull-out voltage Vpo moves in a direction to rise with respect to the absolute value of the voltage "Vtop−Vbtm" (referred to as a second kind of charge injection). When the CV characteristics change as shown in FIGS. 1C and 1D, a fault occurs in which a drive voltage rises and no pull-in takes place, that is, the top electrode does not contact the insulating film.

FIG. 1E is a diagram showing the configuration of a semiconductor integrated circuit which achieves first to sixth embodiments of the present invention described below. This semiconductor integrated circuit comprises a MEMS unit 10 and a circuit unit 20. The MEMS unit 10 and the circuit unit 20 may be formed within the same semiconductor chip, or may be separate in different chips. The circuit unit 20 includes a charge accumulation amount estimating circuit 21, a storage circuit 22, a bias circuit 23 and a controller 24. A node Ntop is a node for connecting the bias circuit 23 and a top electrode 17, and a node Nbot is a node for connecting the bias circuit 23 and a bottom electrode 15. A node N1 is a node for connecting the charge accumulation amount estimating circuit 21 and the bias circuit 23. The charge accumulation amount estimating circuit 21 is a circuit for estimating the accumulation amount of the charge trapped in an insulating film 16 on the bottom electrode 15 in an electrostatic actuator. The result of the estimation of the charge accumulation amount by the charge accumulation amount estimating circuit 21 is stored in the storage circuit 22 such as a register. The bias circuit 23 supplies the bottom electrode 15 and the top electrode 17 with a drive voltage (bias voltage) for driving the electrostatic actuator, on the basis of the estimation result (the charge accumulation amount) stored in the storage circuit 22.

The MEMS unit 10 in FIG. 1E will hereinafter be described in detail.

The MEMS unit 10 includes an electrostatic actuator 11. This MEMS unit 10 has a structure in which one end of an elastic member 14 is fixed to an anchor 13 on a semiconductor substrate 12, and a cavity 30 is provided between the semiconductor substrate 12 and the elastic member 14. The bottom electrode 15 is formed on the semiconductor substrate 12, and the insulating film 16 is formed on the bottom electrode 15 to cover this bottom electrode 15. The top electrode 17 is formed opposite to the bottom electrode 15 on one surface of the elastic member 14. In the MEMS unit 10 having such a configuration, when the electrostatic actuator 11 is driven, the central part of the elastic member 14 deforms to approach the semiconductor substrate 12, and the top electrode 17 moves to the side of the bottom electrode 15, so that the top electrode 17 contacts the insulating film 16 on the bottom electrode 15. Thus, a mechanism in which the distance between the elastic member 14 and the semiconductor substrate 12 changes is used for a switch and a variable capacitor element.

The electrostatic actuator 11 alone is schematically shown as the MEMS unit 10 in FIG. 1E, but the present invention can be applied to various devices including the electrostatic actuator, such as the switch and the variable capacitor element.

FIG. 2 is a sectional view of the MEMS unit when the electrostatic actuator is applied to a contact-type switch. The contact-type switch is constituted by a first electrode 18 and a second electrode 19. The first electrode 18 is formed on the semiconductor substrate 12 adjacently to the bottom electrode 15, and the second electrode 19 is formed on one surface of the elastic member 14 opposite to the first electrode 18 adjacently to the top electrode 17. In the MEMS unit having such a configuration, when the electrostatic actuator 11 is driven, the top electrode 17 moves to the side of the bottom electrode 15 to contact the insulating film 16 on the bottom electrode 15. Consequently, the first electrode 18 and the second electrode 19 are brought into contact with each other and are thus electrically connected with each other, such that the contact-type switch is closed. On the other hand, when the electrostatic actuator 11 is not driven, the cavity is formed between the bottom electrode 15 and the top electrode 17. Thus, the first electrode 18 and the second electrode 19 are out of contact with each other, such that the contact-type switch is open.

Furthermore, FIG. 3 is a sectional view of the MEMS unit when the electrostatic actuator is applied to the variable capacitor element. The variable capacitor element is constituted by the first electrode 18, the second electrode 19, and the insulating film 16 disposed between the first and second electrodes. The first electrode 18 is formed on the semiconductor substrate 12 adjacently to the bottom electrode 15, and the insulating film 16 is disposed to cover the first electrode 18. The second electrode 19 is formed on one surface of the elastic member 14 opposite to the first electrode 18 adjacently to the top electrode 17. In the MEMS unit having such a configuration, when the electrostatic actuator 11 is driven, the top electrode 17 moves to the side of the bottom electrode 15 to contact the insulating film 16 on the bottom electrode 15. Consequently, the insulating film 16 on the first electrode 18 and the second electrode 19 are brought into contact with each other, such that the variable capacitor element is brought into a state having a first capacitance. On the other hand, when the electrostatic actuator 11 is not driven, the cavity is formed between the bottom electrode 15 and the top electrode 17.

Thus, the insulating film 16 on the first electrode 18 and the second electrode 19 are out of contact with each other, such that the variable capacitor element is brought into a state having a second capacitance smaller than the first capacitance.

Moreover, as shown in FIG. 4, the present invention can also be applied to a hybrid actuator combining the electrostatic actuator and an actuator 31 which is not an electrostatic type. The actuator which is not the electrostatic type includes, for example, a piezoelectric, thermal or electromagnetic actuator. If the hybrid actuator is employed, the top electrode 17 can also be moved to the side of the bottom electrode 15 by the actuator 31 which is not the electrostatic type, so that the voltage for driving the electrostatic actuator 11 can be reduced.

First Embodiment

A semiconductor integrated circuit in the first embodiment of the present invention will be described.

FIG. 5 is a diagram showing the configuration of the semiconductor integrated circuit in the first embodiment. As described above, this semiconductor integrated circuit comprises a MEMS unit 10 and a circuit unit 20. The MEMS unit 10 includes an electrostatic actuator 11 having a capacitance Ces. The circuit unit 20 comprises a charge accumulation amount estimating circuit 21, a storage circuit 22, a bias circuit 23 and a controller 24.

The bias circuit 23 includes a voltage generating circuit 25, and switch elements SW1, SW2, SW3 and SW4. By the switching of these switch elements SW1, SW2, SW3 and SW4, an output voltage of the voltage generating circuit 25 is switched and output to a top electrode 17 (node Ntop) or a bottom electrode 15 (node Nbot) of the electrostatic actuator 11. At this point, a ground voltage GND is supplied to the top electrode 17 or the bottom electrode 15 to which the voltage generating circuit 25 is not connected. That is, the switch elements SW2 and SW3 are open when the switch elements SW1 and SW4 are closed, while the switch elements SW2 and SW3 are closed when the switch elements SW1 and SW4 are open. Opening or closing of each switch element is based on data stored in the storage circuit 22. The data indicates the amount of a charge accumulated in an insulating film 16 estimated by the charge accumulation amount estimating circuit 21.

FIG. 6A is a diagram of the charge accumulation amount estimating circuit 21 in the circuit unit 20. The capacitance Ces is a capacitance between the top electrode 17 and the bottom electrode 15 of the electrostatic actuator 11. The value of the capacitance Ces when the top electrode 17 of the electrostatic actuator 11 is down is referred to as a capacitance Cdown, while the value of the capacitance Ces when the top electrode 17 is up is referred to as a capacitance Cup. The capacitance Cdown is larger than the capacitance Cup. The value of a fixed capacitance Cref is set to a value substantially in the middle of the capacitance Cup and the capacitance Cdown (Cref≅(Cup+Cdown)/2).

The relation of connection to the charge accumulation amount estimating circuit 21 is as described below. An output voltage Ves of the voltage generating circuit 25 is supplied to the top electrode 17 via a switch element S5, and a ground voltage GND is supplied to the bottom electrode 15. Moreover, the output voltage Ves is supplied to one electrode of a capacitor having the fixed capacitance Cref via a switch element S6, and a ground voltage is supplied to the other electrode. A constant voltage V1 is supplied to one electrode of a first capacitor having a constant capacitance C1 via a switch element S1, and a ground voltage is supplied to the other electrode. In the same manner, the constant voltage V1 is supplied to one electrode of a second capacitor having the constant capacitance C1 via a switch element S2, and a ground voltage is supplied to the other electrode.

One end (node N11) of a switch element S3 is connected to a connection point between the top electrode 17 and the switch element S5, and the other end of the switch element S3 is connected to a positive input terminal of a comparator CP and to a connection point between the one electrode of the first capacitor C1 and the switch element S1. One end (node N12) of a switch element S4 is connected to a connection point between the one electrode of the capacitor having the fixed capacitance Cref and the switch element S6, and the other end of the switch element S4 is connected to a negative input terminal of the comparator CP and to a connection point between the one electrode of the second capacitor C1 and the switch element S2. Then, an output voltage Vout corresponding to the result of comparing the voltages input to the positive input terminal and negative input terminal of the comparator CP is output from an output terminal of the comparator CP. In addition, a circuit in which a sense amplifier SA is disposed instead of the comparator CP as shown in FIG. 6B may be used for the charge accumulation amount estimating circuit 21 shown in FIG. 6A.

Furthermore, when the MEMS unit 10 and the circuit unit 20 are configured by separate semiconductor chips, it is desirable to form the fixed capacitance Cref on the same chip as the MEMS unit 10. The reason is that the value of a parasitic capacitor differs from the value of a parasitic resistance and the accuracy of the operation of estimating the charge accumulation amount is lost if the fixed capacitance Cref and the MEMS unit 10 are not formed on the same chip. In addition, the constant voltage V1 is a voltage higher than a voltage VmonH and a voltage VmonL which will be described later.

Furthermore, a time in which the output voltage Ves of the voltage generating circuit 25 is supplied to the top electrode 17 is referred to as a mode 1, and a time in which the output voltage Ves is supplied to the bottom electrode 15 is referred to as a mode 2. A pull-out voltage falls due to dielectric charging in the mode 1, and rises in the mode 2. In the present embodiment, the pull-out voltage is monitored every time a voltage application sequence terminates, and the switch is made between the mode 1 and the mode 2 so that the pull-out voltage may be within a predetermined range. This means to put the amount of the charge trapped in the insulating film of the electrostatic actuator 11 within a proper range. To be specific, this is implemented in the following manner.

FIG. 7 shows a voltage waveform of the output voltage Ves of the voltage generating circuit 25 in the mode 1. FIG. 8 shows a voltage waveform in the operation of estimating the charge accumulation amount in the mode 1. FIG. 9 shows a voltage waveform of the output voltage Ves of the voltage generating circuit 25 in the mode 2. FIG. 10 shows a voltage waveform in the operation of estimating the charge accumulation amount in the mode 2. FIG. 11A is a flowchart showing the operation of the semiconductor integrated circuit in the first embodiment.

Times T1 and T2 in FIGS. 7 and 9 are times in which the electrostatic actuator 11 is driven. To explain in detail, the time T1 is a time in which the top electrode 17 is moved to the side of the bottom electrode 15, and the time T2 is a time (hold time) in which the top electrode 17 is held in contact with the insulating film 16. The length of the time T2 changes depending on applications and how a device is used. When there is not much dielectric charging in the time T1, a hold voltage Vh in the time T2 may be changed to a voltage Vs1 or a voltage Vs2. A time T3 is allotted to the operation of estimating the amount of the charge accumulated in the insulating film 16. The time T3 can be about 100 nsec, and is sufficiently shorter than the time T1 (about 20 μs) and the time T2 (about 1 ms to 1 H). Therefore, performance hardly deteriorates due to the addition of the time T3. During the time T3, the output voltage Ves of the voltage generating circuit 25 is set to the voltage VmonL in the mode 1, and to the voltage VmonH in the mode 2. Moreover, in FIGS. 8 and 10, the switch S1, S2, . . . , S6 are closed when the voltage waveform is at an "H" level.

When the voltage waveform in the mode 1 shown in FIG. 7 is continuously applied, a pull-out voltage Vpo gradually drops as shown in FIG. 12A. If the pull-out voltage Vpo is higher than the voltage VmonL as a result of the operation of estimating the charge accumulation amount by the charge accumulation amount estimating circuit 21, the mode 1 is still continued. On the other hand, when the pull-out voltage Vpo has become lower than the voltage VmonL, the transition is then made to the mode 2. Information for deciding which mode is to be executed is stored in the storage circuit 22. That is, the charge accumulation amount estimating circuit 21 stores first data in the storage circuit 22 if the pull-out voltage Vpo is higher than the voltage VmonL, while the charge accumulation amount estimating circuit 21 stores second data in the storage circuit 22 when the pull-out voltage Vpo is lower than the voltage VmonL. The controller 24 executes the mode 1 when the first data is stored in the storage circuit 22, and executes the mode 2 when the second data is stored.

In addition, the level relation between the pull-out voltage Vpo and the voltage VmonL can be estimated by the charge accumulation amount estimating circuit 21 shown in FIG. 6A. A potential difference ΔV between the node N11 and the node N12 is as shown in Equation (1).

$$\Delta V = \frac{C1(V1 - VmonL)(Cref - Ces)}{(C1 + Ces)(C1 + Cref)} \quad (1)$$

Therefore, the sizes of the capacitance Ces and the capacitance Cref are known by monitoring the output voltage Vout of the comparator CP in FIG. 6A, and this shows the level relation between the pull-out voltage Vpo and the voltage VmonL.

In the same manner, if the voltage waveform in the mode 2 is continuously applied, the pull-out voltage Vpo gradually rises as shown in FIG. 12B. When the pull-out voltage Vpo has exceeded the voltage VmonH, the transition is then made to the mode 1. That is, the charge accumulation amount estimating circuit 21 stores the first data in the storage circuit 22 if the pull-out voltage Vpo is higher than the voltage VmonH (if the absolute value of Vpo is lower than the absolute value of VmonH), while the charge accumulation amount estimating circuit 21 stores the second data in the storage circuit 22 when the pull-out voltage Vpo is lower than the voltage VmonH (if the absolute value of Vpo is higher than the absolute value of VmonH). The controller 24 executes the mode 1 when the first data is stored in the storage circuit 22, and executes the mode 2 when the second data is stored.

The operations in the mode 1 and the mode 2 will be described below using the flowchart shown in FIG. 11A. The operation in the mode 1 is as follows. First, the output destination of the voltage generating circuit 25 is set to the top electrode 17 by the switch elements SW1 and SW4, and a voltage Vs is applied to the top electrode 17 by the bias circuit 23 (time T1), and then the electrostatic actuator 11 is driven (step S1). Subsequently, the hold voltage Vh is applied to the top electrode 17 by the bias circuit 23 (time T2), and the electrostatic actuator 11 is brought into a held state (step S2).

Furthermore, the voltage VmonL is applied to the top electrode 17 by the bias circuit 23 (time T3), and the amount of the charge accumulated in the insulating film 16 of the electrostatic actuator is estimated by the charge accumulation amount estimating circuit 21 shown in FIG. 6A (step S3). Whether the amount of the charge accumulated in the insulating film 16 is larger than a predetermined charge amount, that is, whether the capacitance Ces between the top electrode 17 and the bottom electrode 15 is larger than the capacitance Cref is estimated (step S4). When the capacitance Ces is not larger than the capacitance Cref, the transition is made to step S1, so that the electrostatic actuator 11 is driven, and the processing after step S2 is repeated. On the other hand, when the capacitance Ces is larger than the capacitance Cref, the second data is stored in the storage circuit 22, and the switch elements SW1 and SW4 are set so that the output destination of the voltage generating circuit 25 is changed to the bottom electrode 15 (step S5).

Subsequently, the transition is made to the mode 2, and the operation in the mode 2 is as follows. The voltage Vs is applied to the bottom electrode 15 by the bias circuit 23 (time T1), and the electrostatic actuator 11 is driven (step S6). Then, the hold voltage Vh is applied to the bottom electrode 15 by the bias circuit 23 (time T2), and the electrostatic actuator 11 is brought into the held state (step S7).

Furthermore, the voltage VmonH is applied to the bottom electrode 15 by the bias circuit 23 (time T3), and the amount of the charge accumulated in the insulating film 16 of the electrostatic actuator is estimated by the charge accumulation amount estimating circuit 21 shown in FIG. 6A (step S8). Whether the amount of the charge accumulated in the insulating film 16 is larger than the predetermined charge amount, that is, whether the capacitance Ces between the top electrode 17 and the bottom electrode 15 is larger than the fixed capacitance Cref is estimated (step S9). When the capacitance Ces is not larger than the capacitance Cref, the transition is made to step S6, so that the electrostatic actuator 11 is driven, and the processing after step S7 is repeated. On the other hand, when the capacitance Ces is larger than the capacitance Cref, the first data is stored in the storage circuit 22, and the switch elements SW1 and SW4 are set so that the output destination of the voltage generating circuit 25 is changed to the top electrode 17 (step S10). Then, the transition is made to the mode 1.

In FIG. 13, there is shown a potential difference between the voltage (Vtop) of the top electrode and the voltage (Vbtm) of the bottom electrode in the continuous operation of the semiconductor integrated circuit. In addition, in FIG. 13, the voltage Vs1 and the voltage Vs2 which are the magnitudes of voltage amplitudes do not necessarily have to be the same. In the same manner, hold voltages Vh1 and Vh2 may be changed between the modes 1 and 2.

As described above, the operation in accordance with the flowchart shown in FIG. 11A enables the absolute value of the pull-out voltage Vpo to be greater than the absolute value of the voltage VmonL or the absolute value of the voltage VmonH when the voltage Vtop−Vbtm is positive or negative. This is equivalent to the fact that the amount of the charge within the insulating film 16 in the electrostatic actuator 11 is measured so that the amount of the charge within the insulating film 16 is controlled within a range in which a fault such as stiction does not occur. This makes it possible to provide a semiconductor integrated circuit including an electrostatic actuator 11 which does not cause the stiction even if the electrostatic actuator 11 is kept in the held state for a sufficiently long time. In addition, the reason that the values of the voltage VmonL and the voltage VmonH are different is that cases are assumed where the margin of the pull-out voltage Vpo for preventing the stiction differs depending on the direction of an electric field. However, there are cases where the margin does not depend on the direction of the electric field in some kinds of the insulating film 16. In that case, the values of the voltage VmonL and the voltage VmonH may be the same. That is, VmonL=VmonH=Vmon is possible. A flowchart for this case is shown in FIG. 11B, and a situation during the continuous operation is shown in FIG. 11C. The embodiments of the present invention are characterized in that the direction of the electric field between the top electrode 17 and the bottom electrode 15 is decided in accordance with the value of the pull-out voltage Vpo as described above. Moreover, the pull-out voltage Vpo is determined from a capacitance value of a certain monitor voltage.

In addition, when the second kind of charge injection described above is applied to the embodiments of the present invention, a flowchart shown in FIG. 11D can be employed. The values of the voltage VmonL and the voltage VmonH in this case are decided taking the margin into consideration so that a fault that prevents the pull-in does not occur. In addition, VmonL=VmonH=Vmon is also possible in the case of the second kind of charge injection when the margin can be considered to be not dependent on the direction of the electric field. A flowchart for this case is shown in FIG. 11E.

Next, a semiconductor integrated circuit in a modification of the first embodiment will be described.

FIG. 14 is a diagram showing the configuration of the semiconductor integrated circuit in the modification of the first embodiment. In the first embodiment, the output destination of the output voltage of the voltage generating circuit 25 is switched to the top electrode 17 or the bottom electrode 15 by the switch elements SW1 and SW4 shown in FIG. 5. On the contrary, in the modification of the first embodiment, the switch elements for switching the output destination of the output voltage of the voltage generating circuit 25 are eliminated as shown in FIG. 14, so that the voltage generating circuit 25 outputs a positive or negative output voltage to the top electrode 17, and a ground voltage GND is supplied to the bottom electrode 15. The waveform of the voltage applied across the top electrode 17 and the bottom electrode 15 at this point is shown in FIG. 15. In other respects, the configuration and effects are similar to those in the first embodiment. In addition, while the output voltage of the voltage generating circuit 25 is always supplied to the top electrode 17 in this modification, the output voltage of the voltage generating circuit 25 may be always supplied to the bottom electrode 15.

Furthermore, in the first embodiment described above and its modification, the constant hold voltage Vh is applied during the time T2 in the mode 1 as shown in FIG. 7, but a bipolar voltage waveform may be applied as shown in FIG. 16A. The bipolar voltage waveform means a waveform in which a positive hold voltage (Vh) and a negative hold voltage (Vh) are interchanged at regular times (pulse widths).

Such a bipolar voltage waveform can not totally eliminate the dielectric charging, but can reduce the amount of the charge accumulated in the insulating film 16. The application of such a bias waveform, that is, the bipolar voltage waveform is effective when a hold time of the electrostatic actuator 11 is long and when the dielectric charging during the hold time is not negligible. In addition, the waveform in which the positive or negative hold voltages having the same pulse width and amplitude are interchanged is shown here as the bipolar voltage waveform, but this is not a limitation. It is also possible to use, for example, a waveform in which positive or negative voltages having the same pulse width and a gradually changing amplitude are interchanged (refer to the mode 2 in FIG. 20B), or a waveform in which positive or negative voltages having the same amplitude and a gradually changing pulse width are interchanged (refer to the mode 2 in FIG. 20C), or a waveform in which positive or negative voltages with gradual changes in both the amplitude and pulse width are interchanged (refer to the mode 2 in FIG. 20D). Moreover, in the first embodiment described above and its modification, the actuator is driven so that the pull-out voltage may be within a predetermined range by monitoring the pull-out voltage. However, the actuator may be driven so that a pull-in voltage may be within the predetermined range by monitoring the pull-in voltage instead of the pull-out voltage. FIG. 16B shows a voltage waveform of the output voltage of the voltage generating circuit 25 in this case. As shown in FIG. 16B, the pull-in voltage is monitored in a time T0 at the start of the voltage application sequence. That is, the amount of the charge accumulated in the insulating film 16 can be estimated by judging whether the actuator performs the pull-in by the output voltage Vmo applied in this time T0.

Second Embodiment

Next, a semiconductor integrated circuit in the second embodiment of the present invention will be described. The same signs are assigned to the same parts as those in the configuration of the first embodiment described above.

In the first embodiment, a capacitance value at a predetermined voltage is estimated by the charge accumulation amount estimating circuit 21 shown in FIG. 6A to monitor the amount of the charge accumulated in the insulating film 16. However, other circuit configurations of the charge accumulation amount estimating circuit 21 are also possible. In the second embodiment, another example of the circuit configuration of the charge accumulation amount estimating circuit 21 used in the first embodiment will be described.

FIG. 17 is a diagram of a charge accumulation amount estimating circuit in the second embodiment. FIG. 18 shows a waveform during a estimation operation in the charge accumulation amount estimating circuit. FIG. 19 is a flowchart showing the operation of the semiconductor integrated circuit in the second embodiment.

A voltage Vs is applied to a top electrode 17 by a bias circuit 23 to drive an electrostatic actuator 11 (step S21). Subsequently, a hold voltage Vh is applied to the top electrode 17 by the bias circuit 23, and the electrostatic actuator 11 is brought into a held state (step S22). Then, the amount of a charge accumulated in an insulating film 16 of the electrostatic actuator is estimated by the charge accumulation amount estimating circuit 21 shown in FIG. 17 (step S23). Whether a voltage VN23 is higher than a voltage VrefL and lower than a voltage VrefH is estimated from the amount of the charge accumulated in the insulating film 16 (step S24). When VrefL<VN23<VrefH is satisfied, the transition is made to step S21, and the processing after step S21 is repeated. On the other hand, when VrefL<VN23<VrefH is not satisfied, second data is stored in a storage circuit 22, and switch elements SW1 and SW4 are set so that the output destination of a voltage generating circuit 25 is changed to a bottom electrode 15 (step S25). Then, the transition is made to step S21, and the processing after step S21 is repeated.

In the second embodiment, the applied voltage of the electrostatic actuator 11 is gradually dropped from the hold voltage Vh in the mode of estimating the charge accumulation amount. If a circuit utilizing a current source I as shown in FIG. 17 is employed, a linear drop of the hold voltage Vh can be achieved. When the voltage of a node N21 drops and reaches a pull-out voltage, the top electrode 17 rises and a capacitance Ces decreases. When the capacitance Ces decreases while the amount of the charge at the node N21 is kept constant, the voltage of the node N21 rises. The amount of the rise in the voltage of the node N21 is detected by a comparator CP1. In addition, a voltage drop attributed to the current source circuit is caused from the node N21, but its effects are sufficiently small and not so much as to suppress the voltage rise at the node N21.

If the value of a capacitance Cref1 is about the same as that of a capacitance Cdown, and the start of an electric discharge from the node N21 is earlier than the start of an electric discharge from a node N22, an output voltage Vout1 of the comparator CP1 can be inverted when the value of the capacitance Ces has changed. In response to the inversion of the output voltage Vout1, a switch S16 is opened, and an electric discharge from a node N23 is stopped. The voltage VN23 of the node N23 at this moment reflects the pull-out voltage of the electrostatic actuator. That is, the level of the voltage VN23 corresponds to the level of the pull-out voltage. Therefore, the amount of the charge accumulated in the insulating film 16 can be found from the voltage VN23. If the lower limit and upper limit of the voltage VN23 corresponding to the amount of the charge accumulated in the insulating film 16 that does not cause a fault are the voltage VrefL and the voltage VrefH, the amount of the charge accumulated in the insulating film 16 can be kept at a proper value in accordance with the circuit and the flowchart as shown in FIG. 17 and FIG. 19. In other respects, the configuration and effects are similar to those in the first embodiment.

Third Embodiment

Next, a semiconductor integrated circuit in the third embodiment of the present invention will be described. The same signs are assigned to the same parts as those in the configuration of the first embodiment described above.

In the first embodiment, the operation of estimating the charge accumulation amount is carried out at the end of the mode 1 and mode 2, and the voltage applied across the top electrode and the bottom electrode is inverted when the charge accumulation amount has exceeded a judgment standard. On the contrary, in the third embodiment, the operation of pulling out a charge in an insulating film 16 is intensively carried out when the charge accumulation amount has exceeded the judgment standard.

The waveform of an output voltage Ves of a voltage generating circuit 25 in the third embodiment is shown in FIG. 20A. In the third embodiment, the mode 2 is allotted to an exclusive operation to pull out the charge from the insulating film 16. That is, in the mode 2, the operation of estimating the charge accumulation amount by the application of a voltage Vs2 and the application of a voltage VmonH is only carried out without applying a hold voltage Vh. The application of the voltage Vs2 and the voltage VmonH is repeated until a pull-out voltage reaches the voltage VmonH. FIG. 21 is a flowchart showing the operation of the semiconductor integrated circuit in the third embodiment.

The operation in the mode 1 is as follows. First, the output destination of the voltage generating circuit 25 is set to a top electrode 17 by switch elements SW1 and SW4, and the voltage Vs is applied to the top electrode 17 by a bias circuit 23 (time T1), and then an electrostatic actuator 11 is driven (step S31). Subsequently, the hold voltage Vh is applied to the top electrode 17 by the bias circuit 23 (time T2), and the electrostatic actuator 11 is brought into a held state (step S32).

Furthermore, a voltage VmonL is applied to the top electrode 17 by the bias circuit 23 (time T3), and the amount of the charge accumulated in the insulating film 16 of the electrostatic actuator is estimated by a charge accumulation amount estimating circuit 21 shown in FIG. 6A (step S33). Whether the amount of the charge accumulated in the insulating film 16 is larger than a predetermined charge amount, that is, whether a capacitance Ces between the top electrode 17 and the bottom electrode 15 is larger than a fixed capacitance Cref is estimated (step S34). When the capacitance Ces is larger than the fixed capacitance Cref, the transition is made to step S31, and the processing after step S31 is repeated. On the other hand, when the capacitance Ces is not larger than the fixed capacitance Cref, second data is stored in a storage circuit 22, and the switch elements SW1 and SW4 are set so that the output destination of the voltage generating circuit 25 is changed to the bottom electrode 15 (step S35).

Subsequently, the transition is made to the mode 2, and the operation in the mode 2 is as follows. The voltage Vs is applied to the bottom electrode 15 by the bias circuit 23 (time T1), and the electrostatic actuator 11 is driven (step S36). Then, the voltage VmonH is applied to the bottom electrode 15 by the bias circuit 23 (time T3), and the amount of the charge accumulated in the insulating film 16 of the electrostatic actuator is estimated by the charge accumulation amount estimating circuit 21 shown in FIG. 6A (step S37). Whether the amount of the charge accumulated in the insulating film 16 is larger than the predetermined charge amount, that is, whether the capacitance Ces between the top electrode 17 and the bottom electrode 15 is larger than the capacitance Cref is estimated (step S38). When the capacitance Ces is larger than the fixed capacitance Cref, the transition is made to step S36, and the processing after step S36 is repeated. On the other hand, when the capacitance Ces is not larger than the capacitance Cref, first data is stored in the storage circuit 22, and the switch elements SW1 and SW4 are set so that the output destination of the voltage generating circuit 25 is changed to the top electrode 17 (step S39). Then, the transition is made to the mode 1. In addition, VmonL=VmonH=Vmon is also possible for the reason similar to that in the first embodiment.

In order to clarify the difference between the third embodiment and the first embodiment, a schematic diagram of a change in the amount of the charge accumulated in an insulating film 16 in the third embodiment is shown FIG. 22A, and a schematic diagram of a change in the amount of the charge accumulated in the insulating film 16 in the first embodiment is shown in FIG. 22B. A charge amount Qmax and a charge amount Qmin are the maximum value and minimum value of the charge accumulation amount which do not cause a fault. That is, the charge amount Qmax and the charge amount Qmin are the maximum value and minimum value of the amount of the charge accumulated in the insulating film 16 at which the electrostatic actuator 11 can achieve pull-in at the hold voltage without causing stiction. The amount of the charge accumulated in the insulating film 16 rapidly decreases in the third embodiment, but the amount of the charge accumulated in the insulating film 16 slowly decreases in the first embodiment.

While FIG. 20A and FIG. 21 correspond to the case where the circuit shown in FIG. 6A or 6B is employed as the charge accumulation amount estimating circuit, the third embodiment can also be achieved with the charge accumulation amount estimating circuit in FIG. 17 described in the second embodiment. Moreover, the roles of the mode 1 and the mode 2 in FIG. 20A may be interchanged. That is, the time for applying the hold voltage Vh may be eliminated from the mode 1 so that the mode 1 serves as an exclusive operation mode to return the amount of the charge in the insulating film 16 to an initial value of the mode 2 and the hold voltage Vh is applied in the mode 2. Moreover, the amplitude of the voltage Vs2 in the mode 2 may be changed as shown in FIG. 20B, and the pulse width of the voltage Vs2 in the mode 2 may be changed as shown in FIG. 20C. Further, both the amplitude and the pulse width of the voltage Vs2 in the mode 2 may be changed as shown in FIG. 20D. All of the above make it easy to control the amount of the charge pulled out from the insulating film 16, and makes it possible to suppress a fault of an excessive pull-out of the charge. In addition, the techniques of changing one or both of the amplitude and the pulse width of the voltage Vs2 shown in FIG. 20B, FIG. 20C and FIG. 20D can also be applied the embodiments other than the third embodiment.

Fourth Embodiment

Next, a semiconductor integrated circuit in the fourth embodiment of the present invention will be described. The same signs are assigned to the same parts as those in the configuration of the first embodiment described above.

The first to third embodiments described above are based on the assumption that dielectric charging during the hold time is sufficiently low. However, the dielectric charging during the hold time can not be neglected when the hold time is sufficiently long and when an insulating film in which a charge is easily trapped is employed. In such a case, there is a possibility that stiction occurs after the end of the hold time. On the contrary, there is also a possibility that a phenomenon occurs in which the pull-in can not be achieved by a hold voltage, that is, a held state can not be maintained by the hold voltage. In the fourth embodiment, a method of biasing between a top electrode and a bottom electrode capable of coping with such a case will be described.

FIG. 23 is a flowchart showing the operation of the semiconductor integrated circuit in the fourth embodiment. FIG. 24 and FIG. 25 show output waveforms of a voltage generating circuit 25 in the fourth embodiment.

First, a voltage Vs is applied to a top electrode 17 by a bias circuit 23 (time T1) to drive an electrostatic actuator 11. Then, a hold voltage Vh is applied to the top electrode 17 by the bias circuit 23 (time T2), and the electrostatic actuator 11 is brought into a held state. Further, a voltage VmonL is applied to the top electrode 17 by the bias circuit 23 (time T3) (step S41). Then, whether a pull-out voltage Vpo is higher than the voltage VmonL is detected (step S42). When the pull-out voltage Vpo is higher than the voltage VmonL, the transition is made to step S41, and the processing after step S41 is repeated.

On the other hand, when the pull-out voltage Vpo is not higher than the voltage VmonL in step S42, whether the pull-out voltage Vpo is higher than 0 V is detected (step S43). When the pull-out voltage Vpo is not higher than 0 V, a mode 3 is executed (step S44), and then the transition is made to step S41, and the processing after step S41 is repeated.

Furthermore, when the pull-out voltage Vpo is higher than 0 V in step S43, the output destination of the voltage generating circuit 25 is changed to a bottom electrode 15 (step S45). Then, the voltage Vs is applied to the bottom electrode 15 by the bias circuit 23 (time T1) to drive an electrostatic actuator 11 (step S46). Further, the hold voltage Vh is applied to the bottom electrode 15 by the bias circuit 23 (time T5), and whether the pull-out voltage Vpo is lower than the hold voltage Vh is detected (step S47). When the pull-out voltage Vpo is lower than the hold voltage Vh, a mode 4 is executed (step S48), and then the transition is made to step S46, and the processing after step S46 is repeated.

Moreover, when the pull-out voltage Vpo is lower than the hold voltage Vh in step S47, the hold voltage Vh is applied as it is to the bottom electrode 15 by the bias circuit 23 (time T2), and after the hold time has passed, a voltage VmonH is applied to the bottom electrode 15 by the bias circuit 23 (time T3) (step S49). Then, whether the pull-out voltage Vpo is lower than the hold voltage VmonH is detected (step S50). When the pull-out voltage Vpo is lower than the hold voltage VmonH, the transition is made to step S46, and the processing after step S46 is repeated. On the other hand, when the pull-out voltage Vpo is not lower than the hold voltage VmonH, the output destination of the voltage generating circuit 25 is changed to the top electrode 17 (step S51), and the transition is made to step S41, and then the processing after step S41 is repeated.

A voltage waveform and a flowchart in the mode 3 in FIG. 23 are shown in FIG. 26A FIG. 26B.

The operation in the mode 3 is as follows. First, the voltage Vs is applied to the bottom electrode 15 by the bias circuit 23. Then, the voltage VmonH is applied to the bottom electrode 15 by the bias circuit 23 (step S61). Then, whether the pull-out voltage Vpo is higher than the hold voltage VmonH is detected (step S62). When the pull-out voltage Vpo is not higher than the hold voltage VmonH, the transition is made to step S61, and the processing after step S61 is repeated. On the other hand, when the pull-out voltage Vpo is higher than the voltage VmonH, the processing of the mode 3 is terminated.

A voltage waveform and a flowchart in the mode 4 in FIG. 23 are shown in FIG. 27A and FIG. 27B.

The operation in the mode 4 is as follows. First, the voltage Vs is applied to the top electrode 17 by the bias circuit 23. Then, the voltage VmonL is applied to the top electrode 17 by the bias circuit 23 (step S71). Then, whether the pull-out voltage Vpo is lower than the voltage VmonL is detected (step S72). When the pull-out voltage Vpo is not lower than the voltage VmonL, the transition is made to step S71, and the processing after step S71 is repeated. On the other hand, when the pull-out voltage Vpo is lower than the voltage VmonL, the processing of the mode 4 is terminated.

In the fourth embodiment, after the levels of the pull-out voltage Vpo and the voltage VmonL are compared as in the embodiments described above, the level of the pull-out voltage Vpo is compared with 0 V when it has been proved that Vpo=VmonL. This comparison is carried out to judge whether stiction is caused in the electrostatic actuator 11. When the pull-out voltage Vpo is 0 V or less, the mode 3 is executed judging that the stiction is caused. In the mode 3, the voltage waveform as shown in FIG. 26A is applied to perform the operation shown in FIG. 26B. In this manner, the pull-out voltage Vpo is made higher than the hold voltage VmonH to eliminate the stiction. The comparison operations shown in steps S42 and S43 can be achieved by the charge accumulation amount estimating circuit 21 described in the above embodiments. The comparison operation shown in step S42 is performed in the time T3 in FIG. 24, and the comparison operation shown in step S43 is performed in the time T4 in FIG. 24.

On the other hand, when a fault occurs in which the held state can not be kept by the hold voltage Vh, the voltage waveform as shown in FIG. 27A is applied across the top electrode 17 and the bottom electrode 15 to perform the operation shown in FIG. 27B. In this manner, the pull-out voltage Vpo is made lower than the voltage VmonL. Whether the electrostatic actuator 11 keeps the held state by the hold voltage Vh is detected in the time T5 in FIG. 25. In addition, a flowchart may be employed in which an electric field applied across the top electrode 17 and the bottom electrode 15 is inverted after the pull-out voltage Vpo is brought up to the level of the voltage VmonL in the mode 3. Moreover, VmonL=VmonH=Vmon is also possible for the reason similar to that in the first embodiment.

Fifth Embodiment

Next, a method of driving an electrostatic actuator provided in a semiconductor integrated circuit of the fifth embodiment of the present invention will be described. The same signs are assigned to the same parts as those in the configuration of the first embodiment described above.

The amount of a charge accumulated in the insulating film 16 cannot be known immediately after power is turned on (power-on) to the semiconductor integrated circuit, because the register data is being reset. In such a case, it would be convenient to have a test mode for testing whether a pull-out voltage is within a proper range. In the fifth embodiment, this test mode will be described.

FIG. 28 is a flowchart showing the operation of the test mode provided in the semiconductor integrated circuit in the fifth embodiment. The pull-out voltage is monitored by the charge accumulation amount estimating circuit shown in FIG. 6A or FIG. 17, and when the pull-out voltage is not within the proper range, the mode 3 or mode 4 described above is executed to bring the pull-out voltage into the proper range. The operation of the test mode will be described below in detail.

When power is turned on (power-on) or when a command is input (step S81), whether a pull-out voltage Vpo is lower than a hold voltage Vh is estimated by a charge accumulation amount estimating circuit 21 (step S82). When the pull-out voltage Vpo is not lower than the hold voltage Vh, the transition is made to the mode 4 (step S83). On the other hand, when the pull-out voltage Vpo is lower than the hold voltage Vh, whether the pull-out voltage Vpo is higher than 0 V is estimated by the charge accumulation amount estimating circuit 21 (step S84). When the pull-out voltage Vpo is not higher than 0 V, the transition is made to the mode 3 (step S85). On the other hand, when the pull-out voltage Vpo is higher than 0 V, the test mode is terminated considering that the pull-out Vpo voltage is within the proper range.

In addition, the pull-out voltage is monitored here to adjust the pull-out voltage so that it is brought into the proper range, but a pull-in voltage may be monitored instead of the pull-out voltage to adjust the pull-in voltage so that it is brought into the proper range. Moreover, the test mode may be automatically executed after the power-on in response to a detection signal of the power-on, or the test mode may be executed in response to a command from a controller.

Sixth Embodiment

In a semiconductor integrated circuit (system) which is not equipped with a nonvolatile memory, data in a storage circuit 22, for example, a register which stores the direction of an electric field applied across a top electrode and a bottom electrode is lost when a power is turned off. Therefore, it is necessary to decide data in the register storing the direction of the applied electric field when the power is turned on. The sixth embodiment concerns a method of deciding the data.

FIG. 29 is a flowchart showing the operation of a test mode provided in the semiconductor integrated circuit in the sixth embodiment.

After the power is turned on (step S91), data in the register is set to a decided data value, for example, first data, in response to an output signal of a power on reset circuit (step S92). Then, an electrostatic actuator 11 is driven (step S93), and brought into a held state (step S94). Then, the amount of a charge accumulated in an insulating film 16 of the electrostatic actuator 11 is estimated by a charge accumulation amount estimating circuit 21 (step S95). The time for the holding operation is decided by a user in an ordinary operation, but in this case, the electrostatic actuator 11 is only held for a predetermined time Tph. The time Tph does not have to be a long time, and is therefore 1 msec here. As a result of the operation of estimating the charge accumulation amount, a data value corresponding to the amount of the charge accumulated in the insulating film 16 is entered in the register, so that the occurrence of a fault in the operation in the following steps S96 and S97 can be suppressed.

Seventh Embodiment

In the seventh embodiment, a description will be given of a specific case where a device using an electrostatic actuator is applied to a variable capacitor element (MEMS variable capacitor element).

FIG. 30A is a diagram showing the configuration of a semiconductor integrated circuit including a MEMS variable capacitor element 40 in the seventh embodiment. FIG. 30B is a plan view of the MEMS variable capacitor element 40. The structure of the MEMS variable capacitor element 40 is as follows. Driving top electrodes 17 are fixed to anchors 13 disposed on a semiconductor substrate 12. Driving bottom electrodes 15 and RF bottom electrodes 18A and 18B are formed on the semiconductor substrate 12, and the RF bottom electrodes 18A and 18B are arranged between the driving bottom electrodes 15. Insulating films 16 are formed on the driving bottom electrodes 15 to cover the driving bottom electrodes 15, and an insulating film 42 is formed on the RF bottom electrodes 18A and 18B to cover the RF bottom electrodes 18A and 18B. The RF bottom electrodes 18A and 18B, an RF top electrode 19 and the insulating film 42 constitute the variable capacitor element. Further, an insulating film 41 is inserted between the RF top electrode 19 and the driving top electrode 17, so that the RF top electrode 19 and the driving top electrode 17 are electrically isolated from each other.

The RF bottom electrode is disposed opposite to the RF top electrode 19, and cut under the RF top electrode 19 so that the RF bottom electrodes 18A and 18B are formed as shown in FIG. 30B. The RF bottom electrode 18A is connected to a port 1, and the RF bottom electrodes 18B is connected to a port 2. Therefore, the distance between the RF top electrode 19 and the RF bottom electrodes 18A and 18B is changed by the electrostatic actuator constituted by the driving top electrode 17 and the driving bottom electrodes 15 such that the value of a capacitance between the ports 1 and 2 can be varied.

This embodiment is characterized in that the sign of a voltage "Vtop−Vbtm" is changed in accordance with the amount of the charge in the insulating film 16. One example that achieves this is a method in which the voltage Vtop applied to the driving top electrode 17 is always set at 0 V so that a positive or negative voltage is applied to the voltage Vbtm applied to the driving bottom electrodes 15. However, in this case, a circuit for generating the positive and negative high voltages is needed. The production of such a circuit requires costs on a process. Therefore, it is desirable to change the direction of an electric field between the driving top electrode 17 and the driving bottom electrodes 15 in such a manner that the voltage Vbtm is set at 0 V when a positive high voltage is applied to the voltage Vtop and the voltage Vtop is set at 0 V when a positive high voltage is applied to the voltage Vbtm.

However, in this case, it is impossible to electrically share the RF top electrode 19 and the driving top electrode 17 of the MEMS variable capacitor element 40. The reason is that it is not desirable if the voltage of the RF top electrode 19 changes depending on the direction of the electric field in a driving electrode section (the driving top electrode 17 and the driving bottom electrodes 15). Thus, as shown in FIG. 30A, the insulating film 41 is inserted between the RF top electrode 19 and the driving top electrode 17, so that the RF top electrode 19 and the driving top electrode 17 are electrically isolated from each other. Such a structure also provides an advantage that noise of the driving electrode section can be prevented from being transmitted to the RF electrode section.

Eighth Embodiment

In the eighth embodiment, a description will be given of a specific case where a device using an electrostatic actuator is applied to a switch (MEMS switch 50).

FIG. 31A is a diagram showing the configuration of a semiconductor integrated circuit including the MEMS switch 50. FIG. 31B is a plan view of the MEMS switch 50 in the eighth embodiment. The insulating film 42 is formed on the RF bottom electrodes 18A and 18B in the MEMS variable capacitor element 40 described above. However, no insulating film is formed on an RF bottom electrode 18 in this MEMS switch 50, so that an RF top electrode 19 electrically contacts the RF bottom electrode 18 when the RF top electrode 19 is down. Thus, the RF top electrode 19 can be driven by the electrostatic actuator constituted by driving top electrodes 17 and bottom electrodes 15 to provide an electrical short circuit or open circuit between ports 1 and 2. Since the RF top electrode 19 and the driving top electrode 17 are electrically isolated from each other, this embodiment has effects and advantages similar to those in the seventh embodiment with regard to the method of driving these electrodes.

In addition, the first to eighth embodiments were described, referring mainly to estimate the amount of the charge in the insulating film 16 from the pull-out voltage Vpo. However, the amount of the charge in the insulating film 16 may be estimated by monitoring a pull-in voltage. To this end, a voltage Vs may be changed and monitored if the charge is pulled in. This operation can be achieved by a circuit similar to the charge accumulation amount estimating circuit shown in FIG. 6A or FIG. 6B.

Furthermore, the embodiments described above can be carried out not only in an independent manner but also in a combined manner. For example, for the estimation of the amount of the charge accumulated in the insulating film in the flowchart shown in FIG. 23, the charge accumulation amount estimating circuit shown in FIG. 6B or FIG. 17 may be used, or various other combinations can be used. Moreover, the embodiments described above include various stages of inventions, and a proper combination of a plurality of constituent requirements disclosed in the embodiments makes it possible to extract the various stages of inventions.

According to the embodiments of the present invention, it is possible to provide a semiconductor integrated circuit and a driving method of an electrostatic actuator which can drive the electrostatic actuator without causing a trouble even if a sufficiently long time has passed in a held state.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A semiconductor integrated circuit comprising:
   an electrostatic actuator having a top electrode, a bottom electrode, and an insulating film disposed between the top electrode and the bottom electrode;
   an estimation circuit which estimates the amount of a charge accumulated in the insulating film of the electrostatic actuator;
   a storage circuit which stores a result of the estimation of the charge amount by the estimation circuit; and
   a bias circuit which changes, on the basis of the estimation result stored in the storage circuit, a drive voltage to drive the electrostatic actuator.

2. The semiconductor integrated circuit according to claim 1,
   wherein the bias circuit changes the drive voltage on the basis of the estimation result so that the charge amount falls between a first charge amount and a second charge amount.

3. The semiconductor integrated circuit according to claim 1,
   wherein the estimation circuit comprises a reference capacitor, and estimates the amount of the charge accumulated in the insulating film from the comparison of a voltage generated in the reference capacitor with a voltage generated in a capacitor between the top electrode and the bottom electrode of the electrostatic actuator.

4. A semiconductor integrated circuit comprising:
   an electrostatic actuator having a top electrode, a bottom electrode, and an insulating film disposed between the top electrode and the bottom electrode;
   an estimation circuit which monitors a pull-out voltage to separate the top electrode and the bottom electrode from each other; and
   a bias circuit which decides, on the basis of the pull-out voltage monitored by the estimation circuit, the direction of an electric field applied to the insulating film by the top electrode and the bottom electrode when the electrostatic actuator is driven.

5. The semiconductor integrated circuit according to claim 4,
   wherein the estimation circuit estimates the amount of a charge accumulated in the insulating film from the pull-out voltage of the electrostatic actuator.

6. The semiconductor integrated circuit according to claim 5,
   wherein the estimation circuit comprises a reference capacitor, and estimates the amount of the charge accumulated in the insulating film from the comparison of the reference capacitor with the value of a capacitance between the top electrode and the bottom electrode in the electrostatic actuator.

7. The semiconductor integrated circuit according to claim 6,
   wherein the estimation circuit estimates the amount of the charge accumulated in the insulating film from the comparison of the reference capacitor with the value of a capacitance between the top electrode and the bottom electrode when a potential difference between the top electrode and the bottom electrode corresponds to a first voltage.

8. The semiconductor integrated circuit according to claim 5, further comprising:
   a storage circuit which stores a result of the estimation of the charge amount by the estimation circuit; and
   a control circuit which drives the electrostatic actuator, causes the estimation circuit to estimate the amount of the charge in the insulating film, and decides data to be stored in the storage circuit on the basis of a result of the estimation, when the power-on to the integrated circuit is detected.

9. The semiconductor integrated circuit according to claim 7,
   wherein the bias circuit
   applies the electric field across the top electrode and the bottom electrode in the same direction as that in the previous driving at the next driving of the electrostatic actuator, when the pull-out voltage monitored by the estimation circuit is higher than the first voltage, and
   applies the electric field across the top electrode and the bottom electrode in a direction opposite to that in the previous driving at the next driving of the electrostatic actuator, when the pull-out voltage is lower than the first voltage.

10. The semiconductor integrated circuit according to claim 7,
    wherein the bias circuit
    applies the electric field across the top electrode and the bottom electrode in the same direction as that in the previous driving at the next driving of the electrostatic actuator, when the pull-out voltage monitored by the estimation circuit is lower than the first voltage, and
    applies the electric field across the top electrode and the bottom electrode in a direction opposite to that in the previous driving at the next driving of the electrostatic actuator, when the pull-out voltage is higher than the first voltage.

11. The semiconductor integrated circuit according to claim 9,
    wherein the estimation circuit judges which of the first voltage and the pull-out voltage is higher from the value of the capacitance between the top electrode and the bottom electrode at the first voltage.

12. The semiconductor integrated circuit according to claim 10,
    wherein the estimation circuit judges which of the first voltage and the pull-out voltage is higher from the value of the capacitance between the top electrode and the bottom electrode at the first voltage.

13. A semiconductor integrated circuit comprising:
    an electrostatic actuator having a top electrode, a bottom electrode, and an insulating film disposed between the top electrode and the bottom electrode;
    an estimation circuit which estimates whether the amount of a charge accumulated in the insulating film of the electrostatic actuator is within a predetermined range; and
    a bias circuit which applies a drive voltage across the top electrode and the bottom electrode to inject or pull out a charge into or from the insulating film so that the charge amount falls within the predetermined range, when it is estimated that the amount of the charge accumulated in the insulating film is not within the predetermined range.

14. The semiconductor integrated circuit according to claim 13,
    wherein the predetermined range is between a first charge amount and a second charge amount, and the estimation circuit has a first estimation level and a second estimation level corresponding to the first charge amount and the second charge amount, respectively.

15. The semiconductor integrated circuit according to claim 13,
wherein the estimation circuit comprises a reference capacitor, and estimates the amount of the charge accumulated in the insulating film from the comparison of a voltage generated in the reference capacitor with a voltage generated in a capacitance between the top electrode and the bottom electrode of the electrostatic actuator.

16. Micro-electro-mechanical systems (MEMS) comprising:
an electrostatic actuator having a top electrode, a bottom electrode, and a first insulating film disposed between the top electrode and the bottom electrode, the bottom electrode being formed on a substrate, the top electrode being disposed so that a cavity is present between the top electrode and the substrate;
a first electrode formed on the substrate separately from the bottom electrode;
a second electrode formed so that an insulating member is interposed between the second electrode and the top electrode, the second electrode being disposed opposite to the first electrode; and
a bias circuit which sets the bottom electrode at a ground voltage while a drive voltage is being applied to the top electrode of the electrostatic actuator and which sets the top electrode at the ground voltage while the drive voltage is being applied to the bottom electrode,
wherein the drive voltage and the ground voltage are applied to the top electrode and the bottom electrode by the bias circuit, such that the electrostatic actuator varies the distance between the first electrode and the second electrode.

17. The MEMS according to claim 16, further comprising:
an estimation circuit which estimates the amount of a charge accumulated in the first insulating film of the electrostatic actuator; and
a storage circuit which stores a result of the estimation of the charge amount by the estimation circuit,
wherein the bias circuit determines, on the basis of the estimation result stored in the storage circuit, whether the drive voltage should be applied to the top electrode or to the bottom electrode.

18. The MEMS according to claim 16, further comprising:
a second insulating film disposed between the first electrode and the second electrode,
wherein the first electrode, the second electrode and the second insulating film form a variable capacitor element.

19. The MEMS according to claim 16,
wherein the first electrode and the second electrode form a switch.

20. A driving method of an electrostatic actuator which has a top electrode, a bottom electrode, and an insulating film disposed between the top electrode and the bottom electrode, the method comprising:
detecting one of the power-on and the input of a command;
estimating whether the amount of a charge accumulated in the insulating film is within a predetermined range, when one of the power-on and the input of the command is detected; and
injecting or pulling out a charge into or from the insulating film so that the amount of the charge accumulated in the insulating film falls within the predetermined range, when it is estimated that the charge amount is not within the predetermined range.

* * * * *